US010621597B2

(12) United States Patent
Mascaro et al.

(10) Patent No.: US 10,621,597 B2
(45) Date of Patent: Apr. 14, 2020

(54) METHOD AND SYSTEM FOR UPDATING ANALYTICS MODELS THAT ARE USED TO DYNAMICALLY AND ADAPTIVELY PROVIDE PERSONALIZED USER EXPERIENCES IN A SOFTWARE SYSTEM

(71) Applicant: Intuit Inc., Mountain View, CA (US)

(72) Inventors: Massimo Mascaro, San Diego, CA (US); Joseph Cessna, San Diego, CA (US); Peter Ouyang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 837 days.

(21) Appl. No.: 15/130,560

(22) Filed: Apr. 15, 2016

(65) Prior Publication Data
US 2017/0300933 A1 Oct. 19, 2017

(51) Int. Cl.
*G06Q 30/02* (2012.01)
*G06N 20/00* (2019.01)
*G06N 5/00* (2006.01)
*G06Q 10/06* (2012.01)
*G06Q 10/10* (2012.01)
(Continued)

(52) U.S. Cl.
CPC ......... *G06Q 30/0201* (2013.01); *G06N 5/003* (2013.01); *G06N 7/005* (2013.01); *G06N 20/00* (2019.01); *G06Q 10/0639* (2013.01); *G06Q 10/10* (2013.01); *G06Q 40/00* (2013.01); *G06Q 40/123* (2013.12)

(58) Field of Classification Search
CPC .................. G06Q 30/0201; G06Q 30/0204
See application file for complete search history.

(56) References Cited

U.S. PATENT DOCUMENTS 4,763,277 A 8/1988 Ashford et al.
6,327,574 B1 12/2001 Kramer et al.
6,922,488 B2 7/2005 Mastrianni et al.
(Continued)

FOREIGN PATENT DOCUMENTS

WO WO 2016/039779 3/2016

OTHER PUBLICATIONS

Hoeting et al., "Bayesian Model Averaging," Technical Report 335, Department of Statistics, University of Washington, May 28, 1998, 40 pages.

(Continued)

*Primary Examiner* — Andre D Boyce
(74) *Attorney, Agent, or Firm* — Paradice and Li LLP

(57) ABSTRACT

A method and system adaptively improves potential customer conversion rates, revenue metrics, and/or other target metrics by providing effective user experience options to some users while concurrently testing user responses to other user experience options, according to one embodiment. The method and system selects the user experience options by applying user characteristics data to an analytics model, according to one embodiment. The method and system analyzes user responses to the user experience options to update the analytics model, and to dynamically adapt the personalization of the user experience options, according to one embodiment. The method and system dynamically and automatically defines, evaluates, and updates analytics models to provide progressively improving personalization of user experiences in a software system.

7 Claims, 13 Drawing Sheets

(51) Int. Cl.
*G06Q 40/00* (2012.01)
*G06N 7/00* (2006.01)

(56) References Cited

U.S. PATENT DOCUMENTS

| | | |
|---|---|---|
| 6,973,418 B1 | 12/2005 | Kirshenbaum |
| 7,716,094 B1 | 5/2010 | Sutter et al. |
| 7,769,647 B1 | 8/2010 | Char et al. |
| 7,788,137 B1 | 8/2010 | Tifford |
| 7,788,204 B1 | 8/2010 | Thomas |
| 7,797,166 B1 | 9/2010 | Bradley et al. |
| 7,860,763 B1 | 12/2010 | Quinn et al. |
| 7,917,411 B1 | 3/2011 | Bedell |
| 8,024,660 B1 | 9/2011 | Quinn et al. |
| 8,090,794 B1 | 1/2012 | Kilat et al. |
| 8,099,309 B1 | 1/2012 | Bober |
| 8,190,499 B1 | 5/2012 | McVickar |
| 8,200,527 B1 | 6/2012 | Thompson et al. |
| 8,346,635 B1 | 1/2013 | Olim |
| 8,407,113 B1 | 3/2013 | Eftekhari et al. |
| 8,452,676 B1 | 5/2013 | Talan et al. |
| 8,490,018 B2 | 7/2013 | Carter et al. |
| 8,706,762 B1 | 4/2014 | Patzer et al. |
| 8,768,313 B2 | 7/2014 | Rodriguez |
| 8,775,070 B1 | 7/2014 | Bhatia |
| 8,806,444 B1 | 8/2014 | Podgorny et al. |
| 8,909,568 B1 | 12/2014 | Mann et al. |
| 9,128,911 B1 | 9/2015 | Howe et al. |
| 9,355,650 B2 | 5/2016 | Dimitriadis et al. |
| 9,378,065 B2 | 6/2016 | Shear et al. |
| 9,442,827 B2 | 9/2016 | Mascaro et al. |
| 9,444,824 B1 | 9/2016 | Balazs et al. |
| 9,484,044 B1 | 11/2016 | Mascaro et al. |
| 9,530,434 B1 | 12/2016 | Mascaro et al. |
| 9,648,171 B1 | 5/2017 | Eftekhari et al. |
| 9,870,785 B2 | 1/2018 | Bradley et al. |
| 9,891,792 B1 | 2/2018 | Morin et al. |
| 9,922,668 B2 | 3/2018 | Bradley et al. |
| 9,983,859 B2 | 5/2018 | Mascaro et al. |
| 9,990,544 B1 | 6/2018 | Uribe et al. |
| 10,013,721 B1 | 7/2018 | Laaser et al. |
| 10,096,072 B1 | 10/2018 | Ali et al. |
| 10,162,734 B1 | 12/2018 | Podgorny et al. |
| 10,169,828 B1 | 1/2019 | Morin et al. |
| 10,176,534 B1 | 1/2019 | Mascaro et al. |
| 10,204,382 B2 | 2/2019 | Morin et al. |
| 2002/0152457 A1 | 10/2002 | Jahnke |
| 2003/0028451 A1 | 2/2003 | Ananian |
| 2003/0144868 A1 | 7/2003 | MacIntyre et al. |
| 2006/0112114 A1 | 5/2006 | Yu et al. |
| 2006/0143093 A1 | 6/2006 | Brandt et al. |
| 2006/0155632 A1 | 7/2006 | Cherkas et al. |
| 2006/0294084 A1 | 12/2006 | Patel et al. |
| 2007/0100679 A1 | 5/2007 | Wollan et al. |
| 2007/0192166 A1 | 8/2007 | Van Luchene |
| 2007/0239518 A1* | 10/2007 | Chung .................. G06Q 30/02 707/758 |
| 2007/0260596 A1* | 11/2007 | Koran .................. G06Q 30/02 |
| 2008/0071703 A1 | 3/2008 | Evans |
| 2008/0077462 A1 | 3/2008 | Patel et al. |
| 2008/0127127 A1 | 5/2008 | Chitgupakar et al. |
| 2008/0147494 A1 | 6/2008 | Larson |
| 2009/0089141 A1* | 4/2009 | Lara .................. G06Q 30/0244 705/14.43 |
| 2009/0106178 A1 | 4/2009 | Chu |
| 2009/0132368 A1 | 5/2009 | Cotter et al. |
| 2009/0313086 A1 | 12/2009 | Lee et al. |
| 2011/0071975 A1 | 3/2011 | Friedlander et al. |
| 2011/0243553 A1* | 10/2011 | Russell .............. G06Q 30/0631 398/25 |
| 2011/0264569 A1 | 10/2011 | Houseworth et al. |
| 2011/0288868 A1 | 11/2011 | Lloyd et al. |
| 2011/0296401 A1* | 12/2011 | DePoy .................... G06F 8/60 717/174 |
| 2012/0027246 A1 | 2/2012 | Tifford et al. |
| 2012/0030079 A1 | 2/2012 | Slater et al. |
| 2012/0030080 A1 | 2/2012 | Slater et al. |
| 2012/0109792 A1 | 5/2012 | Eftekhari et al. |
| 2012/0150888 A1 | 6/2012 | Hyatt et al. |
| 2012/0215669 A1 | 8/2012 | Lieberman et al. |
| 2012/0303559 A1* | 11/2012 | Dolan .................. G06N 20/00 706/12 |
| 2013/0080911 A1 | 3/2013 | Klemm |
| 2013/0088650 A1 | 4/2013 | Rouady et al. |
| 2013/0198047 A1 | 8/2013 | Houseworth et al. |
| 2013/0268468 A1 | 10/2013 | Vijayaraghavan et al. |
| 2013/0282539 A1 | 10/2013 | Murray |
| 2014/0067518 A1 | 3/2014 | McGovern |
| 2014/0068600 A1 | 3/2014 | Ashok et al. |
| 2014/0075336 A1 | 3/2014 | Curtis et al. |
| 2014/0122381 A1 | 5/2014 | Nowozin |
| 2014/0156681 A1 | 6/2014 | Lee et al. |
| 2014/0201045 A1 | 7/2014 | Pai et al. |
| 2014/0359261 A1 | 12/2014 | Collins et al. |
| 2015/0039297 A1 | 2/2015 | Greer et al. |
| 2015/0112826 A1 | 4/2015 | Crutchfield, Jr. |
| 2015/0205842 A1 | 7/2015 | Jain et al. |
| 2015/0220604 A1 | 8/2015 | Bunnell |
| 2015/0227962 A1 | 8/2015 | Wical et al. |
| 2015/0254675 A1 | 9/2015 | Kannan et al. |
| 2016/0012350 A1 | 1/2016 | Narayanan et al. |
| 2016/0029055 A1 | 1/2016 | Villegas et al. |
| 2016/0063645 A1 | 3/2016 | Houseworth et al. |
| 2016/0078471 A1 | 3/2016 | Hamedi |
| 2016/0098804 A1 | 4/2016 | Mascaro et al. |
| 2016/0103667 A1 | 4/2016 | Chen et al. |
| 2016/0148321 A1 | 5/2016 | Ciaramitaro et al. |
| 2016/0180470 A1 | 6/2016 | Mascaro et al. |
| 2016/0180484 A1 | 6/2016 | Roebuck |
| 2016/0217534 A1 | 7/2016 | Goldman et al. |
| 2016/0247239 A1 | 8/2016 | Houseworth et al. |
| 2016/0267397 A1 | 9/2016 | Carlsson |
| 2016/0335674 A1 | 11/2016 | Plourde |
| 2016/0342911 A1 | 11/2016 | Kannan et al. |
| 2016/0350870 A1 | 12/2016 | Morin et al. |
| 2017/0004422 A1 | 1/2017 | Todd et al. |
| 2017/0090893 A1 | 3/2017 | Aditya et al. |
| 2017/0178199 A1 | 6/2017 | Cessna et al. |
| 2017/0186097 A1 | 6/2017 | Mascaro et al. |
| 2017/0193546 A1* | 7/2017 | Bennett .............. G06Q 30/0244 |
| 2017/0195488 A1 | 7/2017 | Pendyala et al. |
| 2017/0200087 A1 | 7/2017 | Mascaro et al. |
| 2017/0220943 A1* | 8/2017 | Duncan .............. G06Q 30/0201 |
| 2017/0236131 A1 | 8/2017 | Nathenson et al. |
| 2017/0270526 A1 | 9/2017 | Fitzgerald |
| 2017/0308960 A1 | 10/2017 | Mascaro et al. |
| 2017/0315791 A1 | 11/2017 | Mascaro et al. |

OTHER PUBLICATIONS

Rokach et al., "Top-Down Induction of Decision Trees Classifiers—A Survey," IEEE Transactions on Systems, Man, and Cybernetics—Part C: Applications and Reviews, vol. 35, No. 4, Nov. 2005, pp. 476-487.

Araujo et al., "Ensemble Forecasting of Species Distributions," ScienceDirect Trends in Ecology and Evolution, vol. 22, No. 1, Sep. 29, 2006, pp. 42-47.

Agrawal et al., "Thompson Sampling for Contextual Bandits with Linear Payoffs," Proceedings of the 30th International Conference on Machine Learning, Atlanta, Georgia, USA, JMLR: W&CP vol. 28, 2013, 9 pages.

Irsoy et al., "Budding Trees," 22nd International Conference on Pattern Recognition, 2014, pp. 3582-3587.

Bell et al., "The use of multi-criteria decision-making methods in the integrated assessment of climate change: implications for IA practitioners," Socio-Economic Planning Sciences vol. 37, Issue 4, Dec. 2003, pp. 289-316, Elsevier Science Ltd.

Lee et al., "The Internet of Things (IoT): Applications, investments, and challenges for enterprises," Business Horizons vol. 58, Issue 4, Jul.-Aug. 2015, pp. 431-440, Elsevier Inc.

Poyarkov et al., "Boosted Decision Tree Regression Adjustment for Variance Reduction in Online Controlled Experiments," KDD '16

(56) References Cited

OTHER PUBLICATIONS

Proceedings of the 22$^{nd}$ ACM SIGKDD International Conference on Knowledge Discovery Data Mining, pp. 235-244, ACM Digital Library.

\* cited by examiner

USER EXPERIENCE OPTION A — 200 intuit TurboTax ⊘    Get Started   Products&Pricing   Help   Tools&Tips   After You File   [Sign In] — 201

Tell us about you – we'll recommend the right product

| Single | Have children/ dependents | Own a home | Maximize deductions and credits | Sold stock or bonds/ Own rental property | Own a business/ Sole proprietor |

View CD/Download products▸

| | Federal Free Edition | Deluxe | Premier | Home & Business |
|---|---|---|---|---|
| Compare our product features | Simple tax returns (1040EZ/1040A) | Maximize your tax deductions | Investments and rental property | Small business owner or sole proprietor |
| | [Start for free] Free federal State additional | [Start for free] $54.99* State additional [Most popular*] | [Start for free] $79.99* State additional | [Start for free] $104.99* State additional |
| Easy prep. print and efile | • | • | • | • |
| Automatically imports your W2 tax forms | • | • | • | • |
| Transfers last year's TurboTax return | | • | • | • |
| Searches 350+ tax deductions and credits (1040 Scedule A) | | • | • | • |

USER EXPERIENCE OPTION B — 210 intuit TurboTax ⊘    Get Started   Products&Pricing   Help   Tools&Tips   After You File   [Sign In] — 211

No matter your tax situation, we have you covered

| | Federal Free Edition | Deluxe | Premier | Home & Business |
|---|---|---|---|---|
| Compare our product features | Simple tax returns (1040EZ/1040A) | Maximize your tax deductions | Investments and rental property | Small business owner or sole proprietor |
| | [Start for free] Free federal State additional | [Start for free] $54.99* State additional [Most popular*] | [Start for free] $79.99* State additional | [Start for free] $104.99* State additional |
| Easy prep. print and efile | • | • | • | • |
| Automatically imports your W2 tax forms | • | • | • | • |
| Transfers last year's TurboTax return | | • | • | • |
| Searches 350+ tax deductions and credits (1040 Scedule A) | | • | • | • |
| Maximizes mortgage/property tax deductions (Schedule A) | | • | • | • |
| Includes itsDeductable™ for charitable donations | | • | • | • |
| Covers miscelaneuos income and some related expenses (1099-MISC) | | • | • | • |

FIG. 2

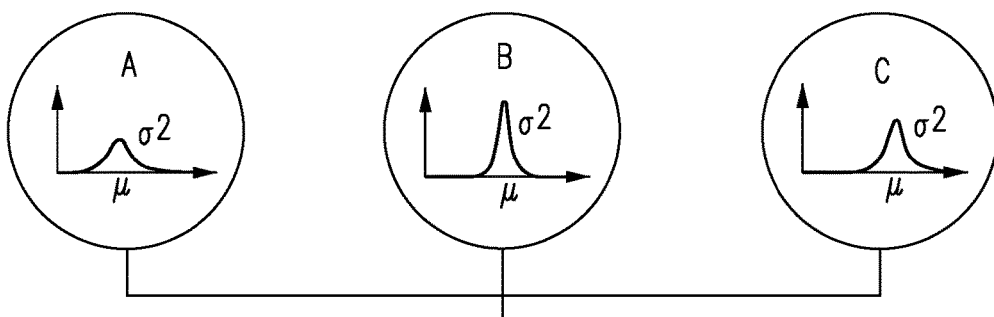

Compute the effective performance of the input estimates blended via Thompson Sampling.

Based on these estimates, compute the probability that the true performance of each experience is better than the other alternatives ($f_i$ is the pdf and $F_i$ is the cdf for the $i^{th}$ experience estimate).

$$p_i^L = p(\bigcap_{j \neq i} \mu_i > \mu_j) = \int f_i(x) \prod_{j \neq i} F_j(x)\, dx$$

e.g.
P(A > B & A > C) = 0.1
P(B > A & B > C) = 0.3
P(C > A & C > B) = 0.6

$\mu$ = sample mean    $\sigma^2$ = sample variance / number of samples

For the segment, define the allocation probability (the probability of assigning a particular experience to a user in this segment) to be equal to the previously computed probability of that experience being the best. That is, if the probability that C is the best experience is 0.6, then we will allocate 60% of the traffic in this segment to experience C. Given this allocation strategy, compute the effective performance of the entire segment as a weighted combination of each experience.

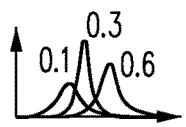   $\mu_{\text{effective}} = 0.1\,\mu_A + 0.3\,\mu_B + 0.6\,\mu_C$   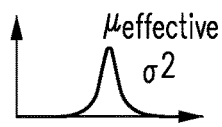

Assignment Prob
P(A) = 0.1
P(B) = 0.3
P(C) = 0.6

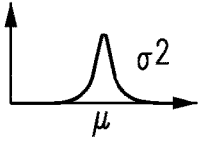

FIG. 11

METHOD AND SYSTEM FOR UPDATING ANALYTICS MODELS THAT ARE USED TO DYNAMICALLY AND ADAPTIVELY PROVIDE PERSONALIZED USER EXPERIENCES IN A SOFTWARE SYSTEM

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. That is, there is little or no opportunity for any analytics associated with the interview process, and/or user experience, to evolve to meet a changing situation or the particular needs of a given taxpayer, even as more information about the particular taxpayer and their particular circumstances is obtained.

As an example, using traditional tax return preparation systems, the sequence of questions and other user experience elements presented to a user are predetermined based on a generic user model that is, in fact and by design, not accurately representative of any "real-world" user. Consequently, irrelevant, confusing, and impersonal user experiences are presented to any given real-world user. Furthermore, user preferences for user experience content, questions, and/or sequences of questions can change with time because user preferences are regularly swayed and/or altered based on information received from traditional media (e.g., magazines), social media (e.g., Facebook), world events, and the like. It is therefore not surprising that many users, if not all users, of these traditional tax return preparation systems receive, at best, an impersonal, unnecessarily long, confusing, and/or complicated interview process and user experience. Clearly, this is not the type of impression that results in happy and loyal repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. As a result, the potential customers do not become proponents for the tax return preparation systems (e.g., by promoting the product to their friends and family), and may instead become opponents to the tax return preparation systems (e.g., by recommending against the use of the systems). This is an undesirable result for both the potential user of the tax return preparation system and the provider of the tax return preparation system.

Some of the shortcomings associated with traditional software systems, e.g., tax return preparation systems, are a result of insufficient, inadequate, and/or antiquated testing techniques. However, even if service providers want to adjust or customize the user experience flow, it can be very difficult to quickly and efficiently ascertain user preferences for content and determine the effect of various types of content on users. Furthermore, the mere act of taking steps to resolve overly long, impersonal, confusing, and/or complicated user experiences can create additional implementation problems to overcome. In short, any potential attempt at personalizing tax return preparation system and/or other software systems is a very difficult task.

What is needed is a method and system for updating analytics models that are used to dynamically and adaptively provide personalized user experiences in a software system, according to various embodiments.

SUMMARY

User preferences for user experience options in software environments are subject to change, and are therefore a moving target for predictive/analytics models. User experience options in software environments can include a myriad of interactive elements such as, user interface colors, user interface button colors, user interface button sizes, types of customer support offered, audio media, video media, types of input user interface elements, whether a standard deduction is offered during a tax return preparation flow, whether an itemized deduction is offered during a tax return preparation flow, and the like. User preferences for user experience options can be influenced by peer choices, personal finances, news articles, social media, advancements in technology, the economy, and other external stimuli. User preferences can also change in non-periodic and non-linear manners (e.g., based on events such as natural disasters and war), making the task of mapping out future changes to user preferences a technologically challenging feat. Thus, to provide software system customers with their personal preferences for user experience options in software environments, an artificially intelligent determination and modeling of personal preferences can be greatly beneficial to personalizing users' experiences in software systems.

Embodiments of the present disclosure provide methods and systems for updating analytics models that identify, predict, and support delivery of user preferences for user experience options, to users of a software system, according to one embodiment. For current users of a software system, the analytics models predict user satisfaction with user experience options based on the behaviors of prior users of the software system, according to one embodiment. The software system adapts to changes in user behaviors and preference by generating, testing and deploying updates to the analytics models—which has a cumulative effect of using artificially intelligence to update the analytics models, according to one embodiment. In particular, the software system analyzes user data with a first (e.g., production)

analytics model while (e.g., concurrently) analyzing the user data with a second (e.g., offline) analytics model to determine which analytics model performs better. The software system them deploys (or maintains deployment of) the better of the two analytics models. By updating the analytics models, the software system dynamically and adaptively improves the performance with which the system provides user preferences for user experience options in the software system, according to one embodiment. By providing users' preferences for user experience options in the software system, the software system increases the likelihood that a customer will complete or perform one or more tasks or actions in a software system, according to one embodiment. The tasks or actions can generate revenue for the software system provider and/or can progress a user towards purchasing a service or product, according to one embodiment. By providing users' preferences for user experience options in software system, the software system also fosters loyalty in customers, resulting in free marketing, a larger customer base, and improved brand recognition, according to one embodiment.

Embodiments of the present disclosure provides methods and systems for updating analytics models based on the statistical strength of an analytics model, according to one embodiment. The statistical strength of the analytics model is an indication of the likelihood that the analytics model is based on enough data that the analytics model accounts for potential variation and error in the data samples used to define the analytics model. If the analytics model is based on a high enough statistical strength, then the likelihood of model error can be decreased and any biases in the data samples can be substantially removed, according to one embodiment. The statistical strength of the analytics model can be based on the number of data samples used to train the analytics model, the quantity/number of data samples used to train sub-sections of the analytics model, the difference between model predictions and users actions, a quantity of data samples that enable removal of data biases, and the like.

By failing to update analytics models, the software system may eventually begin predicting user preferences for user experiences with less accuracy. The analytics models are trained based on the preferences of users who have interacted with the software system in the past. The newer the data samples that are used to train the analytics model, the more the analytics model will reflect changes in attitudes, user preferences, and behaviors. However, some trends and/or user preferences of users are based on quarterly cycles, semi-annual cycles, annual cycles, tax return filing season, and even particular times within the tax return filing season, according to one embodiment. As result, the software system takes into account the recency and relevancy of the data samples that are being used to train and deploy updated analytics models, according to one embodiment.

According to one embodiment, updating an analytics model includes one or more of a number of operations. Updating the analytics model includes receiving user characteristics for each of a number of users of the software system; applying the user characteristics to a production analytics model; delivering user experiences options to users at least partially based on the user characteristics of the users; determining performance metrics for the production analytics model; determining performance metric data for an offline analytics model; and replacing the production analytics model with the offline analytics model, if the performance metrics of the offline analytics model are greater/better than the performance metrics data for the production analytics model, according to one embodiment.

By automating analytics model updates to support providing personalized user experiences to users of a software system, implementation of embodiments of the present disclosure allows for significant improvement to the fields of user experience, electronic tax return preparation, data analytics, data collection, and data processing, according to one embodiment. As one illustrative example, by automating processes for training, testing and deploying updates to analytics models, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by automating the training, testing, and deployment of analytics models that provide personalized user experience options, implementation of embodiments of the present disclosure represent a significant improvement to the field of automated user experiences and, in particular, efficient use of human and non-human resources. There is a long lasting need in the Internet-centric technology of graphical user interfaces, for personalizing the user experiences to reduce user time and user effort to complete tasks in a computing environment. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, while adapting to changes in user behavior over time, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

BRIEF DESCRIPTION OF THE DRAWINGS

FIG. 2 is a diagram of examples of personalized user experiences, in accordance with one embodiment.

FIG. 11 is a flow diagram of an example of a process for computing the effective performance of input estimates blended by Thompson Sampling, according to one embodiment.

Figure 1A:
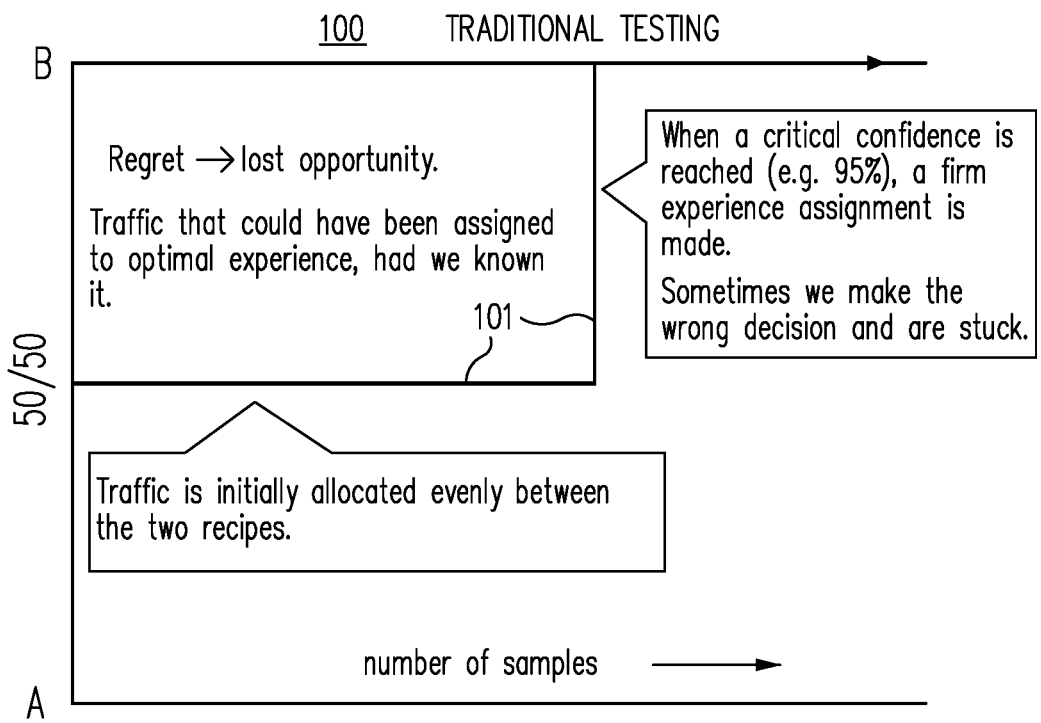
FIGS. 1A and 1B are graph diagrams of A/B testing techniques, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM and the PROCESS AND HARDWARE ARCHITECTURE sections herein describe systems and processes suitable for updating analytics models that are used to dynamically and adaptively provide personalized user experiences in a software system, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms;

icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "decision tree" denotes a hierarchical tree structure, with a root node, parent nodes, and children nodes. The parent nodes are connected to children nodes through edges, and edge logic between parent nodes and children nodes performs a gating function between parent nodes and children nodes to permit or block the flow of a path from a parent node to a child node. As used herein, a node is associated with a node action that a model or process performs on a data sample or on a set of data samples.

As used herein, the term "segment" denotes a portion, section, or subset of a set of users (i.e., a user set). A segment can include an entire set of users or a portion of a set of users. As used herein a segment or sub-segment denotes a portion, section, or subset of users who have one or more user characteristics (as defined below) in common.

As used herein, the terms "distribution rate" and "distribution frequency rate" are used interchangeably to denote decimal numbers, fractions, and/or percentages that represent an average quantity of traffic within a segment of users to which one or more user experience options are provided, with the software system. In alternative language, the term distribution rate denotes decimal numbers, fractions, and/or percentages that represent an average quantity of traffic for a segment of users by which one or more user experience options are provided to a segment of users within a software system. For example, within a single segment of users, a first user experience option A is provided to users with a first distribution rate (e.g., 0.7), and a second user experience option B is provided to users with a second distribution rate (e.g., 0.2). In one embodiment, the second distribution rate is 1 minus the first distribution frequency rate.

As used herein, the term "uncertainty" denotes a quantification of noise, and noise represents the generation or receipt of results that are not representative of the probabilistic outcome for a data set. In other words, noise represents the difference in average or likely results between a small data sample set and a very large data sample set.

Process and Hardware Architecture

Embodiments of the present disclosure provide methods and systems for updating analytics models that identify, predict, and support delivery of user preferences for user experience options, to users of a software system, according to one embodiment. For current users of a software system, the analytics models predict user satisfaction with user experience options based on the behaviors of prior users of the software system, according to one embodiment. The software system adapts to changes in user behaviors and preference by generating, testing and deploying updates to the analytics models—which has a cumulative effect of using artificial intelligence to update the analytics models, according to one embodiment. In particular, the software system analyzes user data with a first (e.g., production) analytics model while (e.g., concurrently) analyzing the user data with a second (e.g., offline) analytics model to determine which analytics model performs better. The software system then deploys (or maintains deployment of) the better of the two analytics models. By updating the analytics models, the software system dynamically and adaptively improves the performance with which the system provides user preferences for user experience options in the software system, according to one embodiment. By providing users' preferences for user experience options in the software system, the software system increases the likelihood that a customer will complete or perform one or more tasks or actions in a software system, according to one embodiment. The tasks or actions can generate revenue for the software system provider and/or can progress a user towards purchasing a service or product, according to one embodiment. By providing users' preferences for user experience options in the software system, the software system also fosters loyalty in customers, resulting in free marketing, a larger customer base, and improved brand recognition, according to one embodiment.

Embodiments of the present disclosure provide methods and systems for updating analytics models based on the statistical strength of an analytics model, according to one embodiment. The statistical strength of the analytics model is an indication of the likelihood that the analytics model is based on enough data that the analytics model accounts for potential variation and error in the data samples used to define the analytics model. If the analytics model is based on a high enough statistical strength, then the likelihood of model error can be decreased and any biases in the data samples can be substantially removed, according to one embodiment. The statistical strength of the analytics model can be based on the number of data samples used to train the analytics model, the quantity/number of data samples used to train sub-sections of the analytics model, the difference between model predictions and users actions, a quantity of data samples that enable removal of data biases, and the like.

By failing to update analytics models, the software system may eventually begin predicting user preferences for user experiences with less accuracy. The analytics models are trained based on the preferences of users who have interacted with the software system in the past. The newer the data samples that are used to train the analytics model, the more the analytics model will reflect changes in attitudes, user preferences, and behaviors. However, some trends and/or user preferences of users are based on quarterly cycles, semi-annual cycles, annual cycles, tax return filing season, and even particular times within the tax return filing season, according to one embodiment. As result, the software system takes into account the recency and relevancy of the data samples that are being used to train and deploy updated analytics models, according to one embodiment.

An analytics model embodies the algorithmic logic that is used to determine the users' preferences for the user experience options, according to one embodiment. The software system uses the user experience analytics model to concurrently, dynamically and adaptively validate and test the effects of user experience options amongst groups of current users, as a new technique for A/B testing user experience options. The software system groups prior and current users into segments of users, based on the user characteristics (e.g., age, income, home ownership, time data, etc.) that are common to the segments of users. The user experience analytics model determines likely preferences for current users based on the preferences of prior users, and the software system applies at least two different user experience options to the current users of a segment to validate some users' preference for one of the user experience options and to test other users' preference for the other of the user experience options. By dynamically adapting the frequency with which the two different user experience options are delivered to current users of a particular segment, the software system dynamically adapts and improves the accuracy with which the software system delivers user experience options that are actually or likely to be preferred by the current users of the software system, according to one embodiment. The software system analyzes user responses to the user experience options to update the user experience analytics model and to dynamically adapt the personalization of the user experience options, at least partially based on feedback from users, according to one embodiment. In one embodiment, the software system is a tax return preparation system.

Embodiments of the disclosed software system provide superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to prefer. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

Figure 1B:
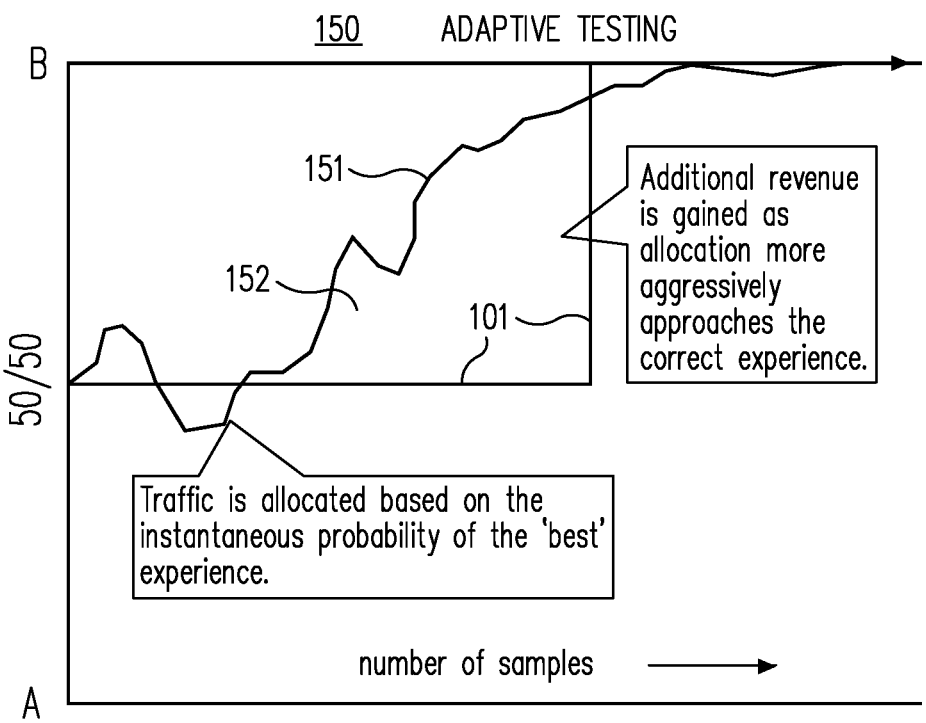

FIGS. 1A and 1B are graphical representations of some of the advantages of adaptive A/B testing over traditional A/B testing, according to one embodiment. FIG. 1A is an example of a graph 100 that illustrates delivery of a condition A to 50% of a user set and delivery of a condition B to 50% of a user set for a number of samples (x-axis), using traditional A/B testing techniques. Conditions A and B are equally distributed to the user sets until a critical confidence level is reached, e.g., 95%. After the critical confidence level is reached, traditional testing techniques switch to delivering the more successful of the conditions to 100% of the user set. In the graph 100, the test switches at a number of samples, represented by graph line 101, that were tested until a confidence level (e.g., 95%) was reached. Everything above and to the left of the graph line 101 represents lost opportunity to provide condition B to the user set rather than condition A (condition A ultimately being deemed inferior).

FIG. 1B shows a graph 150 that illustrates an adaptive delivery of condition A (e.g., a first user experience option) and condition B (e.g., a second user experience option) to the user set while determining which condition is superior to the other, according to one embodiment. The graph 150 includes a graph line 151 that represents a percentage of condition B that is allocated to the user set, according to one embodiment. The area 152 that is under the graph line 151 illustrates that more users of the user set receive condition B sooner by using adaptive A/B testing instead of the traditional A/B testing illustrated by FIG. 1A, according to one embodiment. Importantly, providing condition B sooner equates to providing more users with user experiences that are in accordance with the users' preferences and that are more likely to assist users in completing or accomplishing a particular activity (e.g., providing personal information, paying for a service, signing up as a service provider customer, staying logged in to a user session, complete filing a tax return, etc.), according to one embodiment. Thus, implementation of adaptive testing by providing personalized user experiences in a software system, as disclosed herein, translates to increases in quantities of satisfied customers and improved revenue for the service provider of the software system, according to one embodiment. The systems, methods, algorithms, and techniques of FIGS. 3-12B disclose various embodiments that leverage the advantages of adaptive testing as described with respect to FIGS. 1A and 1B, according to one embodiment.

FIG. 2 illustrates an example embodiment of a personalized user experience 200 and a personalized user experience 210, which can be delivered to a user via a software system, at least partially based on characteristics of the user, to increase user satisfaction with the user experience and to cause the user to perform one or more actions (e.g., answer a question, provide personal information, file a tax return, remain logged in to the software system, etc.), according to one embodiment. The personalized user experiences 200 and 210 display several optional versions of a software system that can be purchased or used to prepare a tax return for the user, according to one embodiment. The personalized user experience 200 includes a number of icon buttons 201, representing a user experience option A, according to one embodiment. The personalized user experience 210 includes a text banner 211, representing a user experience option B, according to one embodiment. The analytics model used by the software system provides the personalized user experience 200 or the personalized user experience 210 to users, based on the user characteristics of the users, based on the segment associated with the users, and/or based on the likelihood that the users will have a preference for the user experience option A or the user experience option B, according to one embodiment. The personalized user experiences 200 and 210, the icon buttons 201, and the text banner 211, are merely a few examples of hundreds or thousands of possible variations of personalized user experiences and of user experience options that can be identified, generated, and/or delivered to users based on the users' preferences for user experience options, to encourage the users to perform one or more actions towards becoming a paying customer of a tax return preparation system or of another service provided by a service provider, according to one embodiment.

Figure 3:
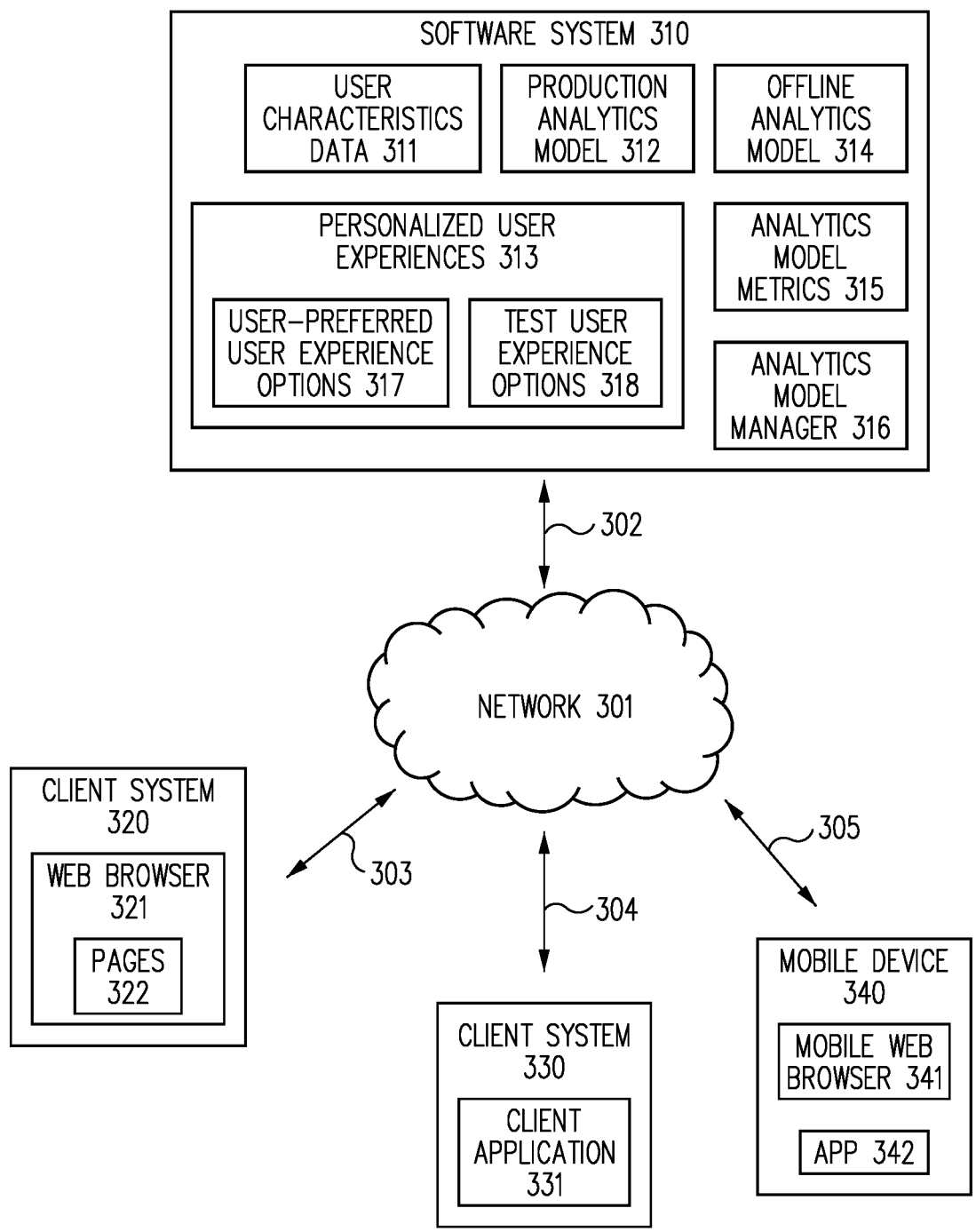
FIG. 3 is a block diagram of a software service environment that updates analytics models used to provide personalized user experiences to users of a software service, in accordance with one embodiment.

FIG. 3 illustrates an example of a software services environment 300 that is configured to provide personalized user experiences to one or more client systems in order to motivate and/or encourage users associated with the client systems, to perform one or more actions, e.g., actions towards filing a tax return, according to one embodiment. The software services environment 300 is configured to intelligently automate a process for updating analytics models, which identify and support delivery of personalized user experiences for users of the software system, according to one embodiment. The software services environment 300 includes a software system 310, a client system 320, a client system 330, a mobile device 340, and a network 301, according to one embodiment. The software system 310 communicates with client system 320, the client system 330, and the mobile device 340 through one or more communications channels 302, 303, 304, and 305, through the network 301, according to one embodiment.

The software system 310 includes a number of components configured to enable the software system to automate a process of updating analytics models to provide personalized user experiences for the purpose of encouraging and/or motivating users to perform one or more actions within the software services environment 300 or within the software system 310, according to one embodiment. The software system 310 includes user characteristics data 311, a production analytics model 312, personalized user experiences 313, an offline analytics model 314, analytics model metrics 315, and an analytics model manager 316, according to one embodiment. The software system 310 gathers user characteristics data 311 from one or more users of the software system 310, according to one embodiment. The software system 310 is also configured to gather the user characteristics data 311 about the users of the software system 310 through one or more of a variety of third-party sources, according to one embodiment. The software system 310 applies the user characteristics data 311 to the production analytics model 312 to determine which of the user-preferred user experiences options 317 and which of the test user experience options 318 to include in the personalized user experiences 313, for delivery to the users of the software system 310, according to one embodiment.

The software system 310 determines if an offline analytics model 314 performs better than the production analytics model 312, to determine which of the two analytics models to deploy in production for identifying, generating, and/or delivering personalized user experiences 313 to the users of the software system 310, according to one embodiment. The software system 310 generates the offline analytics model 314, at least partially based on the user characteristics data 311, according to one embodiment. The particular techniques used to generate the offline analytics model 314 are discussed below in FIGS. 4-12B, according to one embodiment. Once the software system 310 has defined the offline analytics model 314, the software system 310 generates analytics model metrics 315 for the offline analytics model 314, according to one embodiment. The analytics model metrics 315 represent the performance metrics for the production analytics model 312 and for the offline analytics model 314, according to one embodiment. The analytics model metrics 315 represent metrics such as potential customer-to-paying customer conversion rates, revenue generation, and other business-related or operational-related metrics that are used to determine the quality of the analytics models, according to one embodiment. The software system 310 compares the analytics model metrics 315 for the offline analytics model 314 and the production analytics model 312 to determine which of the analytics models is likely to have a better performance in identifying user preferences for user experience options, in order to generate personalized user experiences 313, according to one embodiment.

The analytics model manager 316 compares the production and offline analytics models and determines which of the analytics models has better performance, according to one embodiment. The analytics model manager 316 deploys the offline analytics model 314 in the software system 310 as production analytics model 312 to replace the production analytics model 312, if the analytics model manager 316 determines the offline analytics model 314 is likely to perform better than the production analytics model 312, according to one embodiment. By generating, evaluating, and comparing new offline analytics models 314, the analytics model manager 316 and/or the software system 310 are able to automate and build intelligence into the deployment of production analytics models 312, dynamically and adaptively, to reduce latency in delivering updated analytics models for delivering personalized user experiences 313 to the users of the software system 310, according to one embodiment. The deployment of updated analytics models increases the likelihood of encouraging, motivating, persuading, and/or inducing users to perform one or more actions towards adapting, using, and potentially paying for the services offered by the software system 310, according to one embodiment.

The software services environment 300 uses the production analytics model 312 to determine which of the user-preferred user experience options 317 and test user experience options 318 to deliver to users in the personalized user experiences 313, according to one embodiment. The user-preferred user experience options 317 are user experience options that have a higher likelihood of being preferred by or satisfactory to a user than the test user experience options 318, according to one embodiment. The software system 310 divides or categorizes users into segments of users and delivers at least one of the user-preferred user experience options 317 and at least one of the test user experience options 318 to users within the segments of users, so that each user receives either a user-preferred user experience option or a test user experience option, according to one embodiment.

The analytics model manager 316 applies one or more conditions to the user characteristics data 311 that is used to define the offline analytics model 314, according to one embodiment. The analytics model manager 316 trains, defines, and/or generates the offline analytics model 314, until each node of a decision tree is defined by at least a certain number of data points (e.g., 50 data points), according to one embodiment. By ensuring that at least a certain number of data points are used in the definition, training, and/or generation of the offline analytics model 314, the analytics model manager 316 reduces the likelihood or unexpected or spurious results from the offline analytics model 314 if it were deployed into production, according to one embodiment.

The analytics model manager 316 applies one or more conditions to the user characteristics data 311 to evaluate the offline analytics model 314, according to one embodiment. The analytics model manager 316 applies the user characteristics data 311 and the user responses to the offline analytics model 314, until each node of a decision tree for the offline analytics model 314 receives at least a certain number of data points (e.g., 50 data points), before determining the results of the model to be stable, tested, and/or validated, according to one embodiment. By ensuring that at least a certain number of data points are applied to each node of the offline analytics model 314 (e.g., a decision tree), the analytics model manager 316 reduces the likelihood or unexpected or spurious results from the offline analytics model 314, if it were deployed into production, according to one embodiment. Furthermore, the analytics model manager 316 is then able to compare the analytics model metrics 315 for the offline analytics model 314 and the production analytics model 312 to determine which analytics model is performing better, according to one embodiment.

The client system 320 includes a web browser 321 used to access one or more pages 322 to enable one or more users to interact with the software system 310, according to one embodiment.

The client system 330 includes a client application 331 installed on the client system 330, to enable a user to interact with the software system 310, according to one embodiment. In one embodiment, the client system 330 is a desktop computing system, according to one embodiment.

The mobile device 340 includes a mobile web browser 341 and/or an application ("app") 342 for remotely accessing and interacting with the software system 310, according to one embodiment. In one embodiment, the mobile device 340 is a tablet, a smart phone, a laptop, a personal digital assistant, and the like, according to various embodiments.

The client system 320, the client system 330, and the mobile device 340 are representative of one or more of a plurality of systems/devices with which users of the software system 310 can use to access, interact with, and receive services from the software system 310, according to one embodiment.

Figure 4:
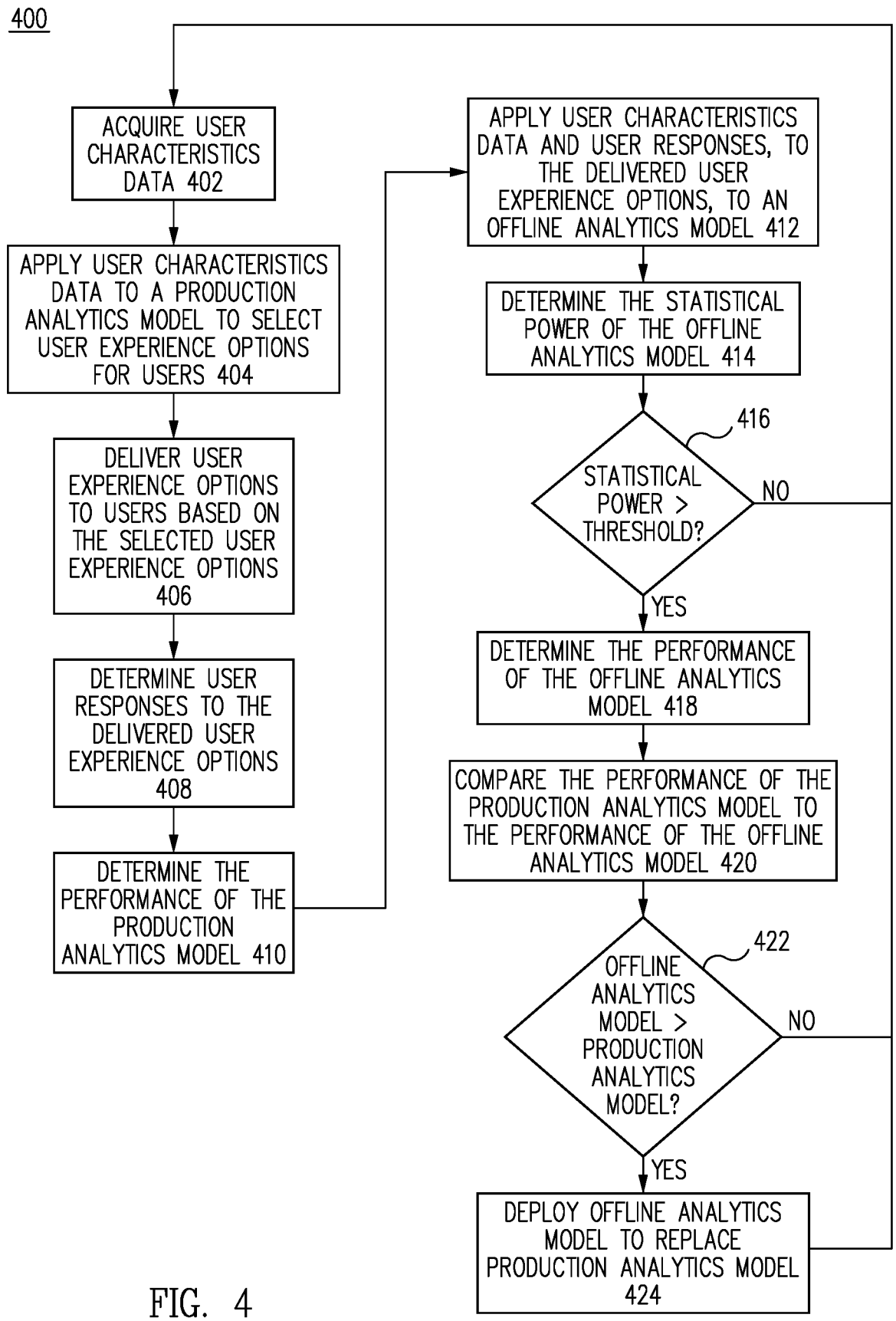
FIG. 4 is a flow diagram of an example of a process for updating analytics models used in a software system to provide personalized user experiences, in accordance with one embodiment.

FIG. 4 includes an example of a method 400 for updating analytics models to provide personalized user experiences to users of a software system, according to one embodiment. The method 400 includes a number of operations for updating the analytics models to provide personalized user experiences to users of the software system, according to one embodiment.

At operation 402, the method includes acquiring user characteristics data, according to one embodiment. Acquiring user characteristics includes, but is not limited to, obtaining hardware or software identification information from the user's computing device, obtaining information about the user's personal or financial status directly from the user, determining information about the user based on the user's internet protocol ("IP") address, and obtaining information about the user from one or more third parties, according to one embodiment. Operation 402 proceeds to operation 404, according to one embodiment.

At operation 404, the method includes applying user characteristics data to a production analytics model to select user experience options for users, according to one embodiment. Operation 404 proceeds to operation 406, according to one embodiment.

At operation 406, the method includes delivering user experience options to users based on the selected user experience options, according to one embodiment. In one embodiment, the selected user experience options are used to generate personalized user experiences that are delivered to one or more user experience displays over one or more communications channels and through one or more networks. Operation 406 proceeds to operation 408, according to one embodiment.

At operation 408, the method includes determining user responses to the delivered user experience options, according to one embodiment. The user responses can include, but are not limited to, performing one or more actions or taking one or more inactions, according to one embodiment. Performing one or more actions can include performing one or more actions towards becoming a paying customer of the software system. Performing one or more action can include, but is not limited to, selecting a hyperlink, reading an email message, remaining logged into a user session in the software system, progressing through one or more menus, submitting personal or financial information to the software system, filing a tax return, returning to a user session in the software system, and the like, according to one embodiment. Performing one or more inactions can include, but is not limited to, ignoring an email message, not returning to a user session in the software system, not progressing through a user interface flow, not filing a tax return, and/or not interacting with a user interface for the software system, according to one embodiment. Operation 408 proceeds to operation 410, according to one embodiment.

At operation 410, method includes determining the performance of the production analytics model, according to one embodiment. Determining the performance of the analytics model includes correlating the user experience options with the users' responses to receiving the user experience options, according to one embodiment. The users' responses can be quantified based on revenue generation, conversion rates of potential customers to paying customers, and other business-related metrics, according to one embodiment. Operation 410 proceeds to operation 412, according to one embodiment.

At operation 412, the method includes applying user characteristics data and user responses, to the delivered user experience options, to an offline analytics model, according to one embodiment. In one embodiment, the method first defines the offline analytics model using some of the user characteristics data, and then tests the offline analytics model with other of the user characteristics data and with the user responses to the production analytics model. Operation 412 proceeds to operation 414, according to one embodiment.

At operation 414, the method includes determining the statistical power of the offline analytics model, according to one embodiment. The statistical power of the offline analytics model is a reflection of the likelihood of resiliency of the analytics model to erroneous or unsatisfactory identification of user preferences for user experience options, according to one embodiment. In one embodiment, statistical power is a measurement of a number of data samples used to define and/or test each node of a decision tree of the offline analytics model. Operation 414 proceeds to operation 416, according to one embodiment.

At operation 416, the method determines if the statistical power of the offline analytics model is greater than a threshold, according to one embodiment. An examples of thresholds for the statistical power is 50 data samples, 100 data samples, 1000 data samples, and the like, according to one embodiment. In one embodiment, the statistical power is based on the number of samples that are needed to reduce the variance of the model's predictions to a quantity of variance that is within a predetermined threshold. If the statistical power is not greater than a threshold, operation 416 proceeds to operation 402, according to one embodiment. If the statistical power is greater than a threshold, operation 416 proceeds to operation 418, according to one embodiment.

At operation 418, the method includes determining the performance of the offline analytics model, according to one embodiment. Operation 418 proceeds to operation 420, according to one embodiment.

At operation 420, the method includes comparing the performance of the production analytics model to the performance of the off-line analytics model, according to one embodiment. Operation 420 proceeds to operation 422, according to one embodiment.

At operation 422, the method determines if the offline analytics model performance is greater than the performance of the production analytics model, according to one embodiment. If the offline analytics model performance is not greater than the performance of the production analytics model, operation 422 proceeds to operation 402, according to one embodiment. If the performance of the offline analytics model is greater than the performance of the production analytics model, operation 422 proceeds to operation 424, according to one embodiment.

At operation 424, the method includes deploying the offline analytics model to replace the production analytics model, according to one embodiment. In one embodiment, the offline analytics model was formerly used as a production analytics model and operation 424 serves to revert to a prior version of a production analytics model. Operation 424 proceeds to operation 402, according to one embodiment.

Figure 5:
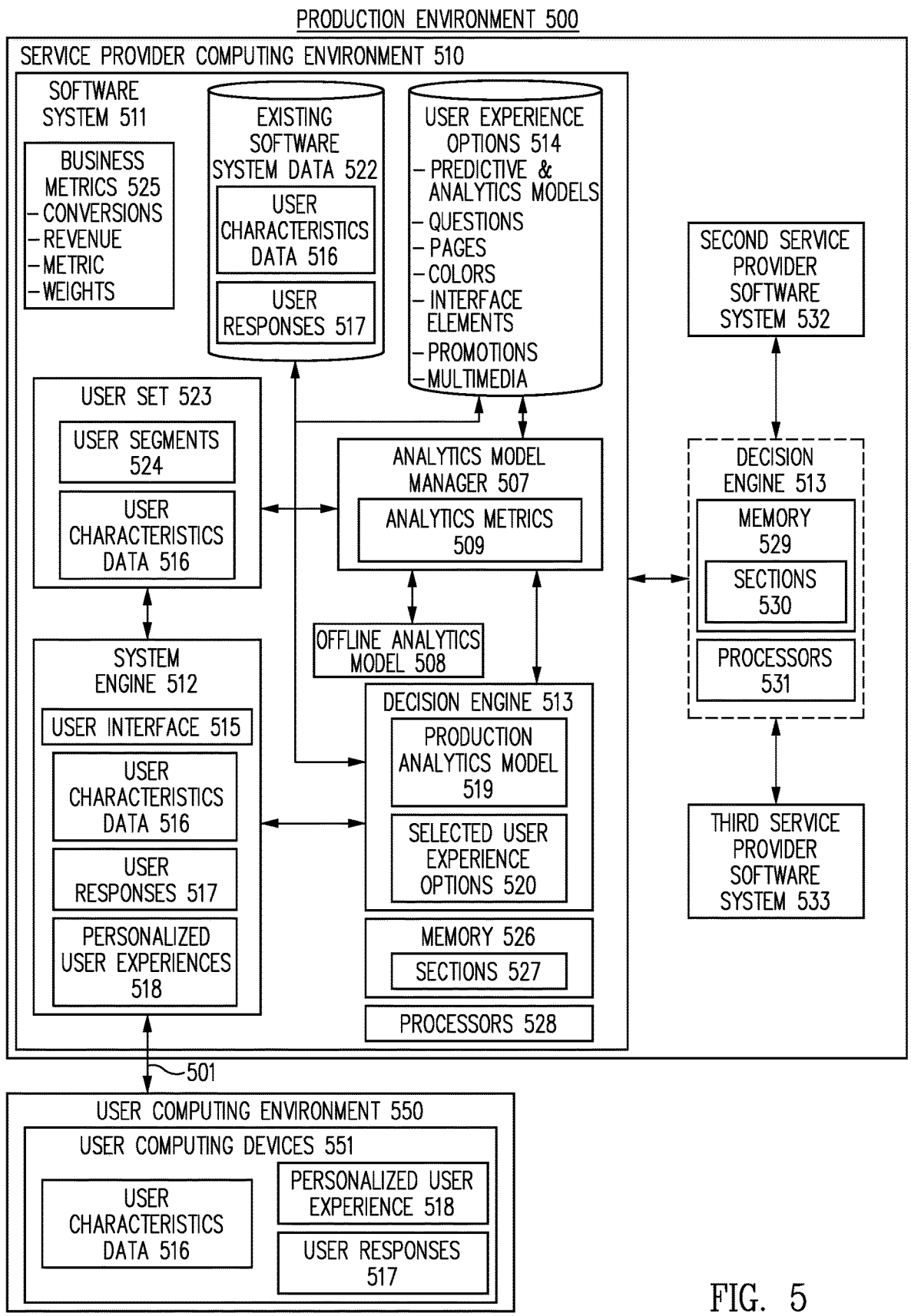
FIG. 5 is a block diagram of an example architecture for providing personalized user experiences with dynamically updated analytics models, in accordance with one embodiment.

FIG. 5 illustrates an example embodiment of a production environment 500 for providing personalized user experiences using dynamically updated analytics models. The production environment 500 includes a service provider computing environment 510 and a user computing environment 550 to deliver personalized user experiences to users of a software system, to cause, motivate, encourage and/or induce the users to perform one or more particular actions (e.g., answer a sequence of questions, continue use of the software system, file a tax return, etc.), according to one embodiment. The computing environments 510 and 550 are communicatively coupled to each other with a communication channel 501, according to one embodiment. The production environment 500 represents an example implementation of the software services environment 300, according to one embodiment.

The service provider computing environment 510 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 510 represents a traditional data center computing environment, a virtual asset computing environment (e.g., a cloud computing environment), or a hybrid between a traditional data center computing environment and a virtual asset computing environment, to host one or more software systems, according to one embodiment. The one or more software systems can include, but are not limited to tax return preparation systems, other financial management systems, and applications that support the tax return preparation systems and/or the other financial management systems, according to one embodiment. The service provider computing environment 510 includes a software system 511 that adaptively provides personalized user experiences by providing users with user experience options in accordance with distribution rates, at least partially based on user characteristics for the users, according to one embodiment. By adaptively providing personalized user experiences, the software system 511 improves user satisfaction, increases service provider revenue, facilitates user interactions with user interfaces, determines user preferences for user experience options, while concurrently, automatically, and seamlessly increasing the distribution of well-performing user experience options to users of the software system 511, according to one embodiment. The software system 511 adaptively provides personalized user experiences by dynamically and automatically generating, evaluating, and selectively deploying updates to analytics models that are used to select which user experience options to deliver to particular users or types of users, according to one embodiment. The software system 511 includes various components, databases, engines, modules, and data to support adaptively providing personalized user experiences to users of the software system 511, according to one embodiment. The software system 511 includes a system engine 512, a decision engine 513, user experience options 514, and an analytics model manager 507, according to one embodiment.

The system engine 512 is configured to communicate information between users and the software system 511, according to one embodiment. The system engine 512 executes/hosts a user interface 515, according to one embodiment. The system engine 512 executes/hosts the user interface 515 to receive user characteristics data 516 and to receive user responses 517 from users, in response to personalized user experiences 518 provided to the users by the software system 511, according to one embodiment. The user interface 515 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the information from users, according to one embodiment.

The system engine 512 and/or the software system 511 communicates with the user through the user computing environment 550, according to one embodiment. The user computing environment 550 includes user computing devices 551 that are representative of computing devices or computing systems used by users to access, view, operate, and/or otherwise interact with the software system 511, according to one embodiment. The term "users" and "user computing devices" are used interchangeably to represent the users of the software system 511, according to one embodiment. Through the user computing devices 551, users provide the user characteristics data 516 and provide the user responses 517 to the software system 511, in response to receipt of the personalized user experiences 518, according to one embodiment.

The user characteristics data 516 represents user characteristics for users of the software system 511, according to one embodiment. The user characteristics data 516 includes information from existing software system data 522, such as one or more previous years' tax return data for a particular user and previous user interactions with the software system 511, according to one embodiment. The user characteristics data 516 is stored in a data store, a database, and/or a data structure, according to one embodiment. The user characteristics data 516 also includes information that the software system 511 gathers directly from one or more external sources such as, but not limited to, a payroll management company, state agencies, federal agencies, employers, military records, public records, private companies, and the like, according to one embodiment. Additional examples of the user characteristics (represented by the user characteristics data 516) include, but are not limited to, data indicating user computing system characteristics (e.g., browser type, applications used, device type, operating system, etc.), data indicating time-related information (hour of day, day of week, etc.), data indicating geographical information (latitude, longitude, designated market area region, etc.), data indicating external and independent marketing segments, data identifying an external referrer of the user (e.g., paid search, add click, targeted email, etc.), data indicating a number of visits made to a service provider website, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, or in the preparation of a user's tax return, according to various embodiments.

The system engine 512 provides personalized user experiences 518, by populating and/or using one or more user experience options 514 in the personalized user experiences 518, according to one embodiment. The user experience options 514 include predictive and analytics models that can be used to determine relevant topics to present to the user; questions to present to user; sequences of topics to present to user; sequences of questions to present to user; and the like, according to one embodiment. The user experience options 514 also include, but are not limited to, questions, webpages, sequences of pages, colors, interface elements, positioning of interface elements within webpages, promotions that can be offered to users, audio files, video files, other multimedia, and the like, according to various embodiments.

Users of the software system 511 have individual preferences, technical competency levels, levels of education, levels of comfort using digital technologies, and other distinctive or individual characteristics that increase the value of personalized user experiences of the software system 511 for the users. To improve the likelihood of satisfaction of the user with his experience with the software system 511, the system engine 512 selectively applies one or more of the user experience options 514 to the personalized user experiences 518 while facilitating interactions between the software system 511 and the users, according to one embodiment.

The software system 511 uses the decision engine 513 to identify which user experience options 514 to apply to the personalized user experiences 518, in order to facilitate, promote, and/or induce one or more particular user actions (e.g., such as completing a set of questions, continuing to use the software system 511, filing a tax return with the software system 511, etc.), according to one embodiment. The decision engine 513 is configured to receive the user characteristics data 516, receive the user experience options 514, and select one or more of the user experience options 514 for the system engine 512 to integrate into the personalized user experiences 518 for users of the software system 511, according to one embodiment.

The decision engine 513 applies the user characteristics data 516 and the user experience options 514 to a production analytics model 519, to determine which user experience options 514 to apply to users with particular user characteristics, according to one embodiment. The production analytics model 519 returns distribution rates for user experience options 514, based on the user characteristics data 516, according to one embodiment. The distribution rates define a frequency with which users having particular user characteristics are provided with particular user experience options, according to one embodiment. In one embodiment, users are provided with particular user experience options, for example, via a universal resource locator ("URL") that the user can select or click. In one embodiment, selected user experience options are delivered to users by modifying the content of personalized user experiences 518.

The decision engine 513 uses the distribution rates from the production analytics model 519 to generate a weighted pseudo-random number that represents the one or more user experience options that are to be provided to a user based on the user's user characteristics data, according to one embodiment. Examples of distribution rates include 0.2 for a first user experience option (or first list of user experience options), 0.5 for a second user experience option (or second list of user experience options), and 0.3 for a combination of one or more other user experience options (or other lists of user experience options), according to one embodiment. In practice, 0.2, 0.5, and 0.3 distribution rates means that for a particular user characteristic, 2 out of 10 users receive the first user experience option (or first list of user experience options), 5 out of 10 users receive the second user experience option (or second list of user experience options), and 3 out of 10 users receive the combination of one or more other user experience options (or other lists of user experience options), according to one embodiment. The decision engine 513 uses the distribution rates and the weighted pseudo-random number to identify selected user experience options 520, for delivery to the user, according to one embodiment.

While the user experience options 514 are described as experience elements/features that are added to the personalized user experiences 518, the selected user experience options 520 can also include the omission of one or more user experience options 514. For example, the production analytics model 519 can be configured to generate distribution frequency rates of 0.8 and 0.2 for determining whether or not to display large icons in the personalized user experiences 518, according to whether the age, income level, employment status, education level, or other user characteristic is above or below one or more thresholds that are set within the production analytics model 519, according to one embodiment. In other words, the output of the production analytics model 519 can be Boolean and can simply determine whether a user receives a user experience option or not, based on the user's user characteristics, according to one embodiment.

The software system 511 operates an analytics model manager 507 to define, train, evaluate, and selectively and automatically update the production analytics model 519 with the offline analytics model 508, according to one embodiment. The analytics model manager 507 uses the user characteristics data 516 from the existing software system data 522 and the user experience options 514 for automatically defining and training the offline analytics model 508 and/or the production analytics model 519, according to one embodiment. The analytics model manager 507 determines the analytics metrics 509 of the offline analytics model 508 and of the production analytics model 519, according to one embodiment. The analytics model manager 507 updates the production analytics model 519 with the offline analytics model 508 using the techniques described for the software services environment 300 and the method 400, if the performance of the offline analytics model 508 is better than the performance of the production analytics model 519, according to one embodiment. The analytics model manager 507, defines, trains and/or updates the analytics models using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment.

In one embodiment, the analytics model manager 507 defines a user set 523 that is based on all or part of the users that have interacted with the software system 511 and/or for whom user characteristics data 516 has been gathered or received. The analytics model manager 507 defines a number of user segments 524 around subsets of commonly held user characteristics. In other words, the user segments 524 are subsets of the user set 523, and each of the user segments 524 have one or more user characteristics in common, according to one embodiment. As used herein, the term "user segment(s)" is used interchangeably with the term "segment(s) of users".

The analytics model manager 507 trains the analytics models by generating a decision tree, based on how particular user experience options 514 perform with particular user segments 524, according to one embodiment. The analytics model manager 507 generates a decision tree as part of the analytics logic for the production analytics model 519, to facilitate generating distribution rates for the user experience options, according to one embodiment. The techniques described herein disclose particular embodiments that may be used by the analytics model manager 507 for initializing and/or updating the offline analytics model 508 and/or the production analytics model 519, according to one embodiment.

The software system 511 adapts to user responses 517 received from users, to update the offline analytics model 508 and/or the production analytics model 519, and to dynamically and adaptively improve the personalized user experiences 518, according to one embodiment. The software system 511 is configured to store/update user characteristics data 516 and user responses 517, as the existing software system data 522, during the operation of the software system 511. The analytics model manager 507 continually creates new offline analytics models 508, trains new offline analytics models 508, and/or evaluates new offline analytics models 508 to determine if an offline analytics model 508 can perform better than the production analytics model 519, according to one embodiment. By continually evaluating one or more new offline analytics models, the analytics model manager 507 can organically evolve its performance, reverted to prior analytics model versions if needed, to deliver a continually improving personalized user experience to the users of the software system 511, according to one embodiment.

The business metrics 525 include, but are not limited to, the various metrics used by the software system 511 and/or the service provider of the software system 511 to evaluate the success, failures and/or the performance of the user experience options 514, according to one embodiment. The business metrics 525 include, but are not limited to, number of conversions of users from potential customers to paying customers, the percentage of conversions of potential customers to paying users, quantities of revenue, rates of revenue collected per user (e.g., average revenue collected per user), increases/decreases in revenue as compared to one or more previous years, months, weeks, days, and metric weights that are applied to conversions and revenues to establish a relative importance of conversions verses revenue generation. The business metrics 525 can also include records of other actions taken by users, such as, but not limited to, numbers of questions answered, duration of use of the software system 511, number of pages or user experience displays visited within a software system 511, use of customer support, and the like, according to one embodiment.

The software system 511 includes memory 526 that has one or more sections 527 allocated for the operation or support of the software system 511, according to one embodiment. For example, the memory 526 and/or the one or more sections 527 are allocated to the storing and/or processing of: user characteristics data 516, user responses 517, the production analytics model 519, the analytics model manager 507, and the like, according to one embodiment. The software system 511 also includes one or more processors 528 configured to execute and/or support the operations of the software system 511, according to one embodiment.

In one embodiment, the decision engine 513 is integrated into the software system 511 to support operation of the software system 511. In one embodiment, the decision engine 513 is hosted in the service provider computing environment 510 and is allocated computing resources, e.g., memory 529 having sections 530, and one or more processors 531, that are different than some of the computing resources of the software system 511. The decision engine 513 is hosted in the service provider computing environment 510 in order to provide support for the software system 511, in addition to providing support for a second service provider software system 532 and/or a third service provider software system 533, according to one embodiment. Although a second service provider software system 532 and a third service provider software system 533 are illustrated and described herein, the decision engine 513 can be configured to operationally support fewer or more software systems, according to various embodiments.

The analytics model manager 507 initializes and/or updates the offline analytics model 508 and/or the production analytics model 519 from a backend or offline system, rather than as an integrated online process, according to one embodiment. For example, rather than sharing memory and processor resources with the software system 511, the analytics model manager 507 is allocated dedicated memory and processor resources to facilitate secure and more timely processing of user characteristics of new and existing software system data, and of user experience options for training the production analytics model 519. In another embodiment, the analytics model manager 507 is integrated into the software system 511, as illustrated, and shares one or more hardware resources with the decision engine 513, within the service provider computing environment 510, according to one embodiment.

Figure 6:
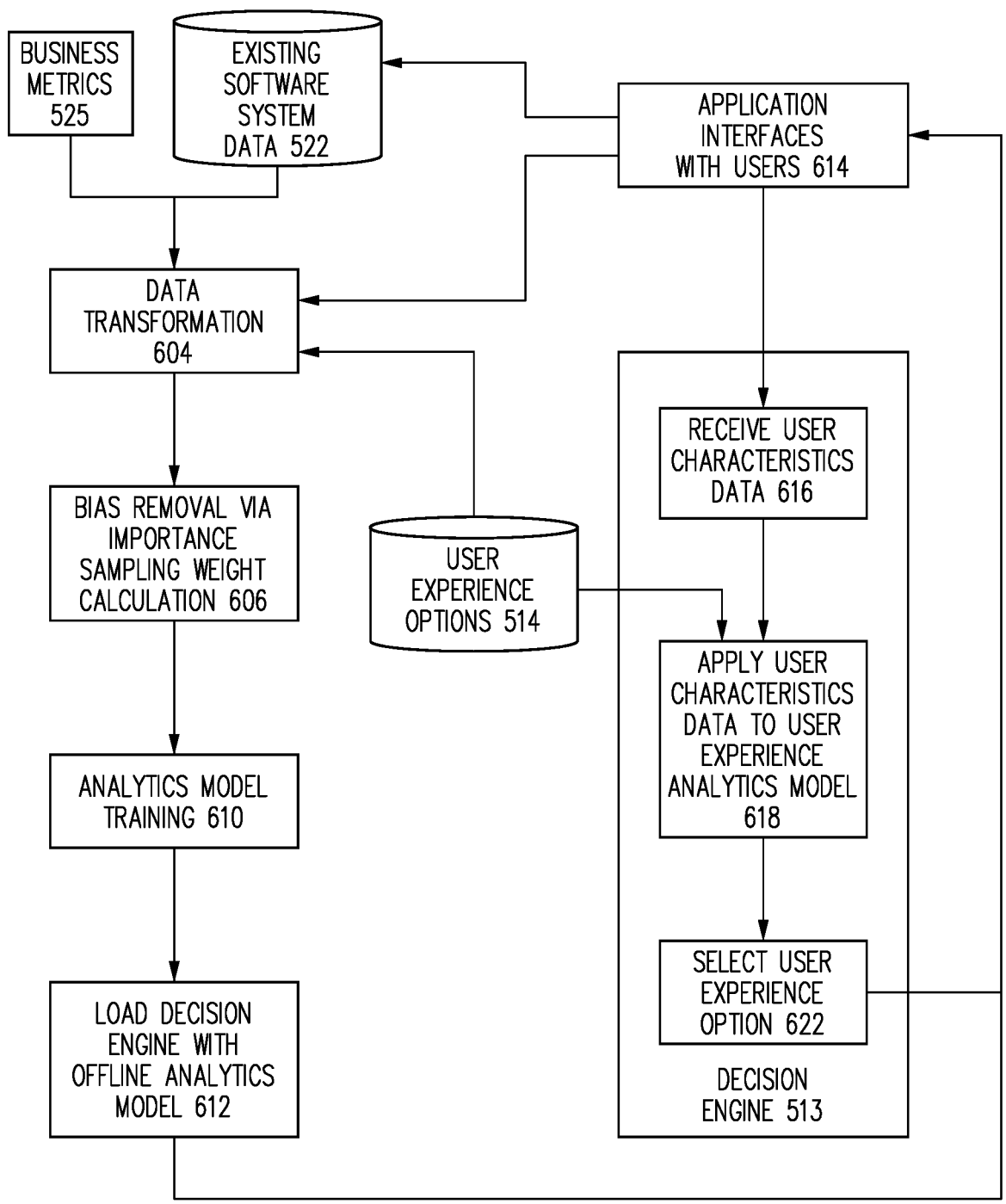
FIG. 6 is a flow diagram of an example of a process for training, updating, and applying an analytics model, according to one embodiment.

FIG. 6 illustrates a process 600 for training and updating the offline analytics model and/or the production analytics model, described above, according to one embodiment.

Figure 7:
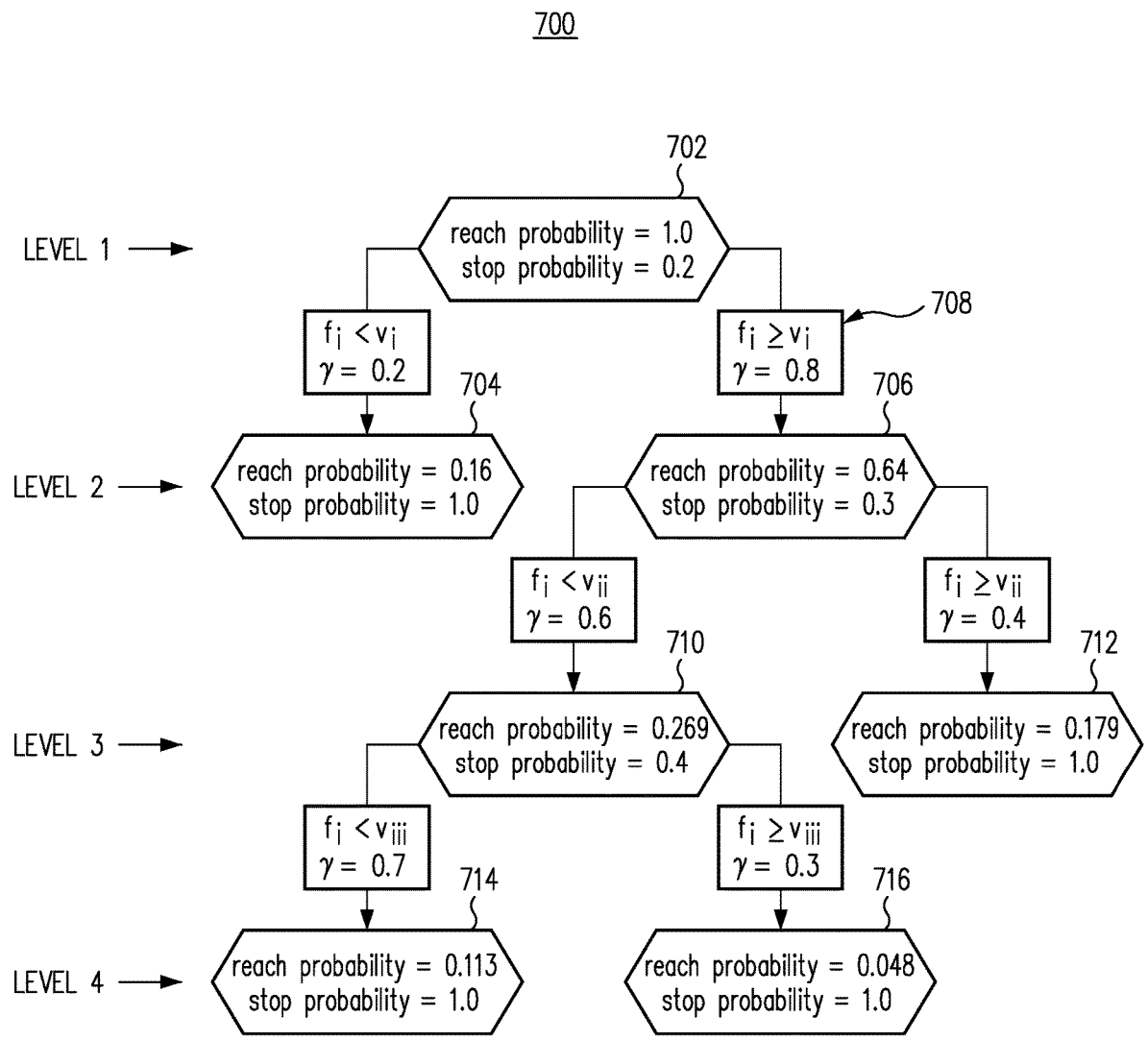
FIG. 7 is diagram of an example of a tree diagram for defining at least part of an analytics model, according to one embodiment.

At operation 604, the process performs data transformation, to prepare existing software system data 522 and data representing business metrics 525 for processing, according to one embodiment. The process performs data transformation on the existing software system data 522 (inclusive of user characteristics data and user responses), on user experience options 514, and on business metrics 525. Data transformation includes, but is not limited to, formatting, rearranging, organizing, ranking, and/or prioritizing the data to enable it to be uniformly processed or analyzed by one or more equations and/or algorithms, according to one embodiment. Operation 604 proceeds to operation 606, according to one embodiment At operation 606, the process performs bias removal via importance sampling weight calculation, according to one embodiment. The process performs bias removal on the business metrics, such as conversions and revenue, as well as on user responses for the existing software system data 522 to account for particular user characteristics that were targeted, that are different, or that otherwise bias the user responses and/or the business metrics, according to one embodiment. Operation 606 proceeds to operation 610, according to one embodiment At operation 610, the process performs analytics model training, according to one embodiment. The process trains the offline analytics model by using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment. Operation 610 proceeds to operation 612, according to one embodiment In one embodiment, the process 600 performs analytics model training by creating, validating, and/or modifying a decision tree. FIG. 7 illustrates an example of a decision tree 700 that can be used to determine at least part of the algorithm, logic, and/or function of the user experience analytics model that selects which user experience options to deliver to users based on user characteristics, to facilitate providing personalized user experiences in the software system 511. The decision tree 700 includes nodes 702, 704, 706, 710, 712, 714, and 716 (collectively, nodes 702-716) connected together through edges and edge logic. The edge logic defines the rules and parameters for traversing from a parent node to a child node in the decision tree 700, according to one embodiment. Each of the nodes 702-716 includes node properties, such as a reach probability, a stop probability, a user experience option, and a user segment.

The reach probability is the probability that a person coming into the stream of the decision tree will reach a particular node, according to one embodiment. Because all users are evaluated by the node 702, the reach probability of the node 702 is 1, indicating that there is a 100% chance that a user's characteristics will be evaluated by the node 702. Node 704 has a reach probability of 0.16 and node 706 has a reach probability of 0.64. Accordingly, of all the user traffic that is applied to the decision tree 700, node 704 will receive 16% of the user traffic and node 706 will receive 64% of the user traffic, on average, according to one embodiment.

In one embodiment, each node represents a segment of users to whom one of two user experience options (from one of two lists of user experience options) is provided. The users of a segment each receive one of two user experience options in accordance with the distribution rate, according to one embodiment. The software system 511 dynamically adapts the distribution rate, based on the evolving performance of user experience options among the users of each segment, according to one embodiment. So, while some users of a segment might initially receive a first user experience option at a distribution rate of 0.7, with time users of the segment may receive the first user experience option at a distribution rate than evolves toward 0.0 or that evolves towards 1.0, based on the responses/actions of the users of the segment that receive the first user experience. Accordingly, the software system validates the performance of one user experience option among the users of a segment, while testing the performance of another user experience option among the other users of the segment, to eventually determine which of two or more user experience options is most preferred by the users of a segment, according to one embodiment.

The stop probability is the probability that the performance of a particular node without children nodes (for a user segment) will be better than the performance of children nodes split from the particular node, according to one embodiment. In other words, the stop probability is the probability that the performance of a leaf node is greater than the performance of creating two children nodes from a leaf node to convert the leaf node to a parent node. If a stop probability is 1, then the probability of stopping the further evaluation of the data sample is 100%. If a stop probability is less than 1, then the stop probability represents a likelihood that the decision tree will apply the user experience option of the current node rather than evaluating a further path through the nodes of the decision tree 700, according to one embodiment. In one embodiment, if a data sample does not receive the user experience option of a parent node, then the data sample receives the user experience option of a descendent node.

At least two user experience options are assigned to each node (i.e., to each segment of users associated with a node) of the decision tree 700. In one embodiment, a user experience option is defined as omitting a user experience element (e.g., a button, a text box, a question, a webpage, etc.) from a user's personalized user experience. In one embodiment, a user experience option is defined as adding a user experience element or applying an analytics model, a sequence, or other user experience tool to a user's personalized user experience. In one embodiment, the user experience analytics model includes a different decision tree for each user experience option, so that each of the nodes in the decision tree represent a binary decision to apply or to not apply a user experience option to the user's personalized user experience. In one embodiment, the user experience analytics model includes a different decision tree for each user characteristic, and each of the nodes in the decision tree represent the application of two of a number of user experience options to users' personalized user experience (e.g., in accordance with distribution rates for the user experience options and for the particular segment of users). In one embodiment, the user experience analytics model includes a decision tree having edge logic that evaluates different user characteristics and each node of the decision tree represent the application of one of a number of user experience options, and the node paths can include a variety user experience options (rather than a Boolean application of a single user experience option).

The user segment is a segment or portion of users who have at least one user characteristic in common. For example, a user set can be bifurcated into two user segments, in which a first user segment includes users who are younger than 30 years old and the second user segment includes users who are at least 30 years old, according to one embodiment.

Each of the nodes 702-716 belong to a level that is defined by 1 plus the number of connections between the node of interest and the root node. Because the root node is the top node in the decision tree 700, the root node for the decision tree 700 is the node 702. Accordingly, node 702 belongs to level 1, nodes 704 and 706 belong to level 2, nodes 710 and 712 belong to level 3, and nodes 714 and 716 belong to level 4 of the decision tree 700, according to one embodiment.

In one embodiment, the user experience option for a node is related to the level of the node in the decision tree 700. In one embodiment, all levels of one decision tree provide binary options for whether or not to apply a single user experience option to a user's personalized user experience. In one embodiment, each level of the decision tree is associated with a different user experience option, and each level of the decision tree provides binary options for whether or not to apply the user experience option associated with that level to a user's personalized user experience. In one embodiment, user experience options are allocated to nodes within the decision tree, based on the dominance or capacity of the user experience option to affect the actions of users, with more dominant user experience options being assigned to nodes that are closer to the root node.

In one embodiment, edge logic includes an edge frequency ($\gamma$) for which a single user characteristic ($f_i$) satisfies a threshold ($v_i$). The edge logic provides rules and the average frequency by which data samples traverse parent nodes to children nodes. The edge logic 708 indicates that the probability of the user characteristic ($f_i$) being greater than or equal to the threshold ($v_i$) is 0.8, and that the probability of the user characteristic ($f_i$) being less than the threshold ($v_i$) is 0.2, according to one embodiment. The reach probability of a child node is the product of the edge frequency ($\gamma$) multiplied with the stop probability subtracted from one. For example, the reach probability of node 706 is 0.64 which is equal to (1−stop probability of node 702)* ($\gamma$=0.8). In one embodiment, the thresholds for descendent nodes are different than all ancestor nodes because each descendent node already satisfies or inherits all of the characteristics of the descendent node's ancestor nodes.

Returning to the process 600 of FIG. 6, at operation 612, the process loads the decision engine with the offline analytics model, according to one embodiment. The process loads or updates the decision engine with the offline analytics model, if the offline analytics model is estimated or determined to be likely to perform better than the production analytics model, according to one embodiment. Operation 612 proceeds to operation 614, according to one embodiment.

At operation 614, an application interfaces with users, according to one embodiment. The application interfaces with users by providing the users with questions to acquire user responses and/or to acquire user characteristics, according to one embodiment. The application interfaces with users by collecting clickstream data, IP address information, location of the user, operating system used by the user, user computing device identifiers, and other user characteristics data, according to one embodiment. The application and the decision engine save business metrics, user characteristics data, and/or user responses as existing software system data 522, according to one embodiment. The term "application" is used interchangeably with the term "software system", according to one embodiment. Operation 614 concurrently proceeds to operation 604 to update the analytics model, and proceeds to operation 616 to apply the analytics model to information received about the users, according to one embodiment.

At operation 616, the decision engine 513 receives user characteristics data, according to one embodiment. Operation 616 proceeds to operation 618, according to one embodiment.

At operation 618, the decision engine 513 applies the user characteristics data to a user experience analytics model, according to one embodiment. The decision engine 513 also applies the user experience options 514 to the analytics model (e.g., the production analytics model), according to one embodiment. The decision engine 513 applies the user characteristics data and the user experience options 514 to the analytics model to determine the distribution rates for which two or more user experience options are to be distributed to users having one or more of the user characteristics received during operation 616, according to one embodiment. Operation 618 proceeds to operation 622, according to one embodiment.

At operation 622, the decision engine 513 selects a user experience option, according to one embodiment. The decision engine 513 selects a user experience option based on the distribution rates generated by the analytics model in response to receipt of user characteristics data that describe a user. The decision engine 513 generates a pseudo-random number that is weighted according to the distribution frequency rates generated by the user experience analytics model, according to one embodiment. For example, if the user experience analytics model generates distribution frequency rates of 0.8 for filling a user experience display with a background color of red and 0.2 for filling a user experience display with a background color of blue, then the decision engine 513 generates a binary number which will indicate selecting a blue background color 8 out of 10 times and will indicate selecting a red background color 2 out of 10 times, on average, according to one embodiment. Because computing systems typically generate "random" numbers using algorithms and clocks, a "random" number generated by a computing system is referred to as a "pseudo-random" number.

Operation 622 proceeds to operation 614, according to one embodiment.

Figure 8:
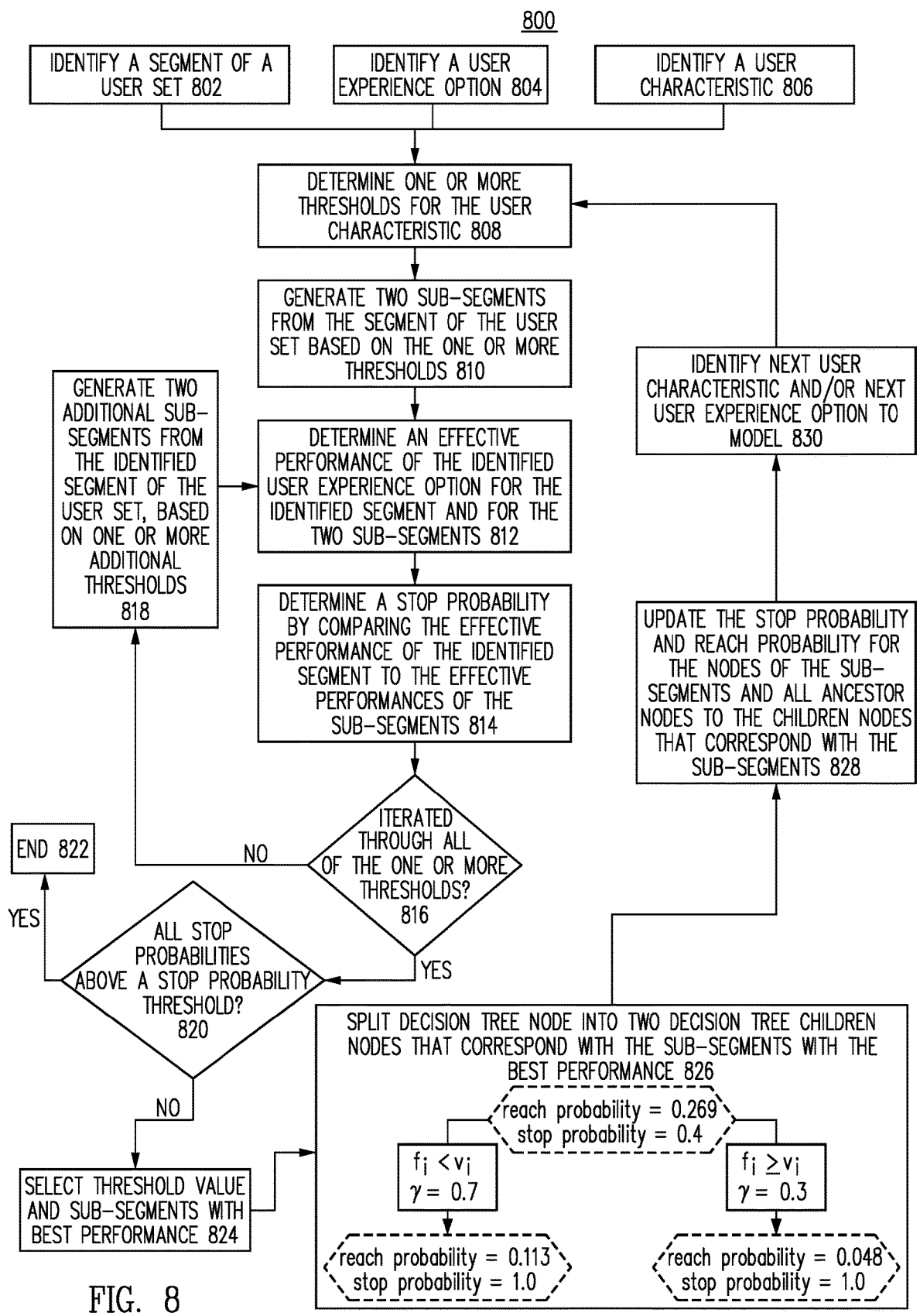
FIG. 8 is a flow diagram of an example of a process for defining an analytics model, in accordance with one embodiment.

FIG. 8 illustrates an example of a process 800 that is employed or executed by the software system 511 of the production environment 500, to periodically update the offline analytics model 508 and/or the production analytics model 519, according to one embodiment. By periodically updating the user experience analytics model and/or by defining/initializing the production analytics model 519, a software system (e.g., a tax return preparation system or other finance management system) can reap the benefits of deploying user experience options that are immediately effective on users (with a probabilistic certainty) while concurrently and adaptively testing user responses to other stimuli, e.g., other user experience options, to improve user satisfaction with the personalized user experience provided by the software system 511, according to one embodiment.

At operation 802 the process identifies a segment of a user set, according to one embodiment. The segment may be the entirety of the user set, may include recent users of the user set, may include users (i.e., prior users) who have interacted with a software system over a predetermined period of time (e.g., during a previous year), or may be any other subset of the user set, according to one embodiment. Operation 802 proceeds to operation 808, according to one embodiment.

At operation 804, the process identifies a user experience option, according to one embodiment. The user experience option identified by the process is used by the process to define nodes, node properties, and edge logic for traversing from parent nodes to children nodes, according to one embodiment. In one embodiment, identifying a user experience option includes identifying a plurality of user experience options, according to one embodiment. In one embodiment, operation 804 occurs prior to operation 802, after operation 802, or concurrently with operation 802, according to one embodiment. Operation 804 proceeds to operation 808, according to one embodiment.

At operation 806, the process identifies a user characteristic, according to one embodiment. As described above, user characteristics can include personal identification information, income information, tax-related information, clickstream information, geographic location of the user, an IP address or other computing or other user computing device identification information, family information about the user, and the like, according to various embodiments. The process performs operation 806 before, in between, after, or concurrently with operation 802 and/or operation 804, according to one embodiment. Operation 806 proceeds to operation 808, according to one embodiment.

At operation 808, the process determines one or more thresholds for the user characteristic, according to one embodiment. By determining the one or more thresholds, the process is able to define additional segments of users, to determine if the identified user experience option more effectively causes one segment of users to perform a particular action better than another segment of users, according to one embodiment. In other words, a threshold value such as 35 years of age, for a user characteristic of age, can be used to bifurcate a segment of users of all ages into to a sub-segment of users who are less than 35 years old and a sub-segment of users who are at least 35 years old, according to one embodiment. Operation 808 proceeds to operation 810, according to one embodiment.

At operation 810, the process generates two sub-segments from the segment of the user set, based on the one or more thresholds, according to one embodiment. The operation 810 proceeds to operation 812, according to one embodiment.

At operation 812, the process determines an effective performance of the identified user experience option for the identified segment and for the two sub-segments, according to one embodiment. The effective performance of the user experience option for the identified segment and/or for the two sub-segments is a probabilistic distribution that users (who are defined by the segments and/or sub-segments) will perform one or more predetermined actions, according to one embodiment. Examples of the determined actions include, but are not limited to, answering questions, remaining logged into a user session of the software system, filing a tax return, progressing through a sequence of topics or a sequence of questions, clicking a button, interacting with a particular user experience object or element, paying for a service, submitting credit card information, providing an email address, providing a telephone number, and the like, according to various embodiments. In one embodiment, the process uses Thompson Sampling on user responses to user experience options, at least partially based on user characteristics data, to determine a sample mean and a sample variance for the performance of user experience options on a segment of users, according to one embodiment. In one embodiment, the process uses Thompson Sampling blending or other mathematical techniques for calculating an average of multiple Thompson Samples to determine an effective performance of a user experience option on a segment or sub-segment, according to one embodiment. Operation 812 proceeds to operation 814, according to one embodiment.

At operation 814, the process determines a stop probability by comparing the effective performance of the identified segment to the effective performances of the two sub-segments of the identified segment, according to one embodiment. The stop probability is the probability that the performance of the identified segment is greater than the effective performance of the two sub-segments, according to one embodiment. In terms of nodes in a decision tree, the stop probability is the probability that the effective performance of a user experience option that is associated with a parent node is greater than an effective performance of user experience options that are associated with children nodes, according to one embodiment. A low stop probability indicates that the likelihood of gaining additional effective performance from the user experience analytics model will likely be gained from splitting an identified segment into two sub-segments, according to one embodiment. Operation 814 proceeds to operation 816, according to one embodiment.

At operation 816, the process determines if the process has iterated through all identified thresholds, according to one embodiment. For user characteristics having binary or Boolean outcomes such as yes or no, there may not be multiple thresholds to iterate through. However, if the user characteristics that are used to define part of the model have continuous values, e.g., users' ages, user income, and the like, then the process advantageously identifies and recurses through the multiple thresholds (e.g., through multiple age ranges or income ranges) to test the effective performance of a user experience option against variations of sub-segments, according to one embodiment. If the process completes iterating through all of the one or more thresholds, operation 816 proceeds to operation 820, according to one embodiment. If the process has not iterated through all of the one or more thresholds, operation 816 proceeds to operation 818, according to one embodiment.

At operation 818, the process generates two additional sub-segments from the identified segment of the user set, based on one or more additional thresholds, according to one embodiment. Operation 818 proceeds to operation 812, according to one embodiment.

At operation 820, the process determines if all stop probabilities are above a stop probability threshold, according to one embodiment. If all stop probabilities are above a stop probability threshold, e.g., 0.8, the operation 820 proceeds to operation 822 to end the process, according to one embodiment. If at least one of the stop probabilities is not above the stop probability threshold, operation 820 proceeds to operation 824.

At operation 824, the process selects a threshold value and the sub-segments with the best performance, according to one embodiment. The effective performance of segments and sub-segments is a probabilistic distribution having a sample mean and a sample variance. In one embodiment, the best performance includes a combination of a threshold and a user experience option that results in the highest sample mean. In one embodiment, the best performance includes a combination of a threshold and a user experience option that produces the lowest sample variance. In one embodiment, the best performance includes a combination of a threshold and a user experience option that produces the highest sample mean and/or the lowest sample variance while having a sample mean that is greater than a minimum threshold and/or while having a sample variance that is below a maximum sample variance threshold. Operation 824 proceeds to operation 826, according to one embodiment.

At operation 826, the process splits a decision tree node into two decision tree children nodes that correspond with the sub-segments with the best performance, according to one embodiment. When creating children nodes, the node properties (e.g., the reach probabilities, stop probabilities, user experience options, etc.) are defined for the children nodes and the node properties for the parent node of the split are also updated. Operation 826 proceeds to operation 828, according to one embodiment.

At operation 828, the process updates the stop probability and the reach probability for the nodes of the sub-segments and all ancestor nodes to the children nodes that correspond with the sub-segments, according to one embodiment. For example, because the sum of the reach probabilities for the nodes of the decision tree is 1, the reach probabilities of ancestor nodes are updated to reflect the addition of the children node reach probabilities, according to one embodiment. Operation 828 proceeds to operation 830, according to one embodiment.

At operation 830, the process identifies a next user characteristic and/or a next user experience option to model, according to one embodiment. Operation 830 proceeds to operation 808, according to one embodiment.

Figure 9:
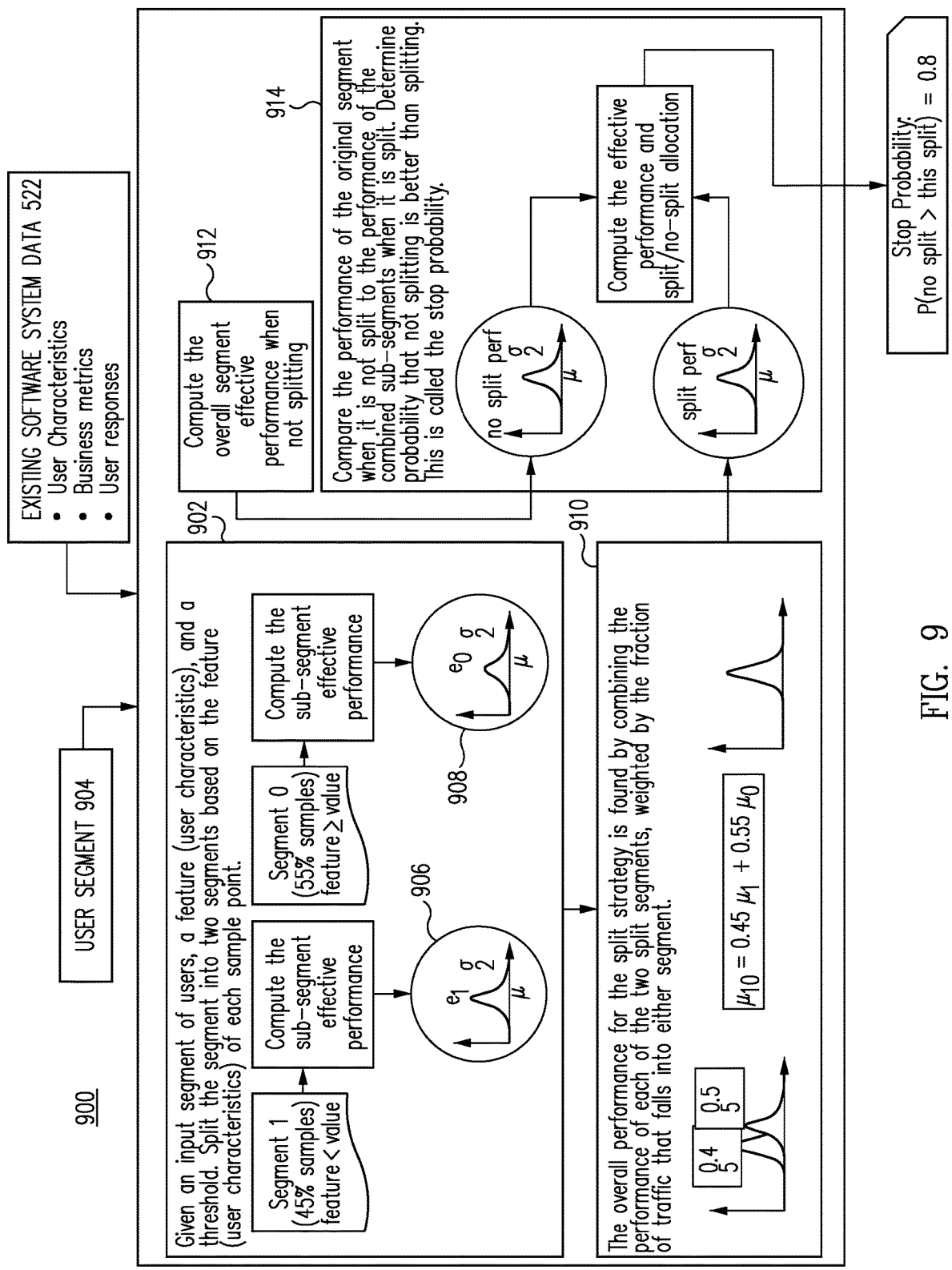
FIG. 9 is a flow diagram of an example of a process for determining a stop probability, in accordance with one embodiment.

FIG. 9 illustrates an example of a flow diagram for a process 900 for determining a stop probability, according to one embodiment. The process 900 is an example of one technique for determining a stop probability that can be performed during operation 814 of FIG. 8 of the process 800 for defining a user experience analytics model, according to one embodiment.

At block 902, the process splits a user segment 904 into two sub-segments, and determines the effective performance of each sub-segment based on existing software system data 522, according to one embodiment. The existing software system data includes, but is not limited to, user characteristics data, user responses, conversion rates of users to paying customers, revenue generated by the software system, and the like, according to one embodiment. The sub-segments are splits based on a value of the threshold and based on whether a user characteristic is less than the value or greater than or equal to the value of the threshold, according to one embodiment. The result of determining the effective performance of each sub-segment is a probabilistic distribution 906 and a probabilistic distribution 908 for the sub-segments, according to one embodiment. The probabilistic distributions 906 and 908 are not just an estimate of the performance of a user experience option on each sub-segment, instead, the probabilistic distributions 906 and 908 are estimations of the probability of the performance of a user experience option on the sub-segments. The effective performances result in probabilistic distributions because the effective performances are estimates of performance that include the uncertainty around how a user will respond to a user experience option integrated into the user's personalized user experience, according to one embodiment. The process proceeds from block 902 to block 910, according to one embodiment.

At block 910, the process determines/computes the combined effective performance of the effective performance of the two sub-segments, according to one embodiment. The process determines the combined effective performance by using addition or other mathematical operations to combine the performance of each sub-segment, with each sub-segment effective performance weighted by the edge frequency ($\gamma$) (fraction of parent node traffic from FIG. 7), to remove bias, in one embodiment. The process proceeds from block 910 to block 914, according to one embodiment.

At block 912, the process determines/computes the effective performance of the segment as though the sub-segments were not being split from the segment, according to one embodiment. In other words, the process computes the overall segment effective performance assuming the segment is not being split. The process proceeds from block 912 to block 914, according to one embodiment.

At block 914, the process compares the effective performance of the segment, when it is not split, to the combined effective performance of the sub-sections, to determine the stop probability, according to one embodiment. The stop probability is the probability that the effective performance of the un-split segment is greater or better than the effective performance of splitting the segment, according to one embodiment.

Figure 10:
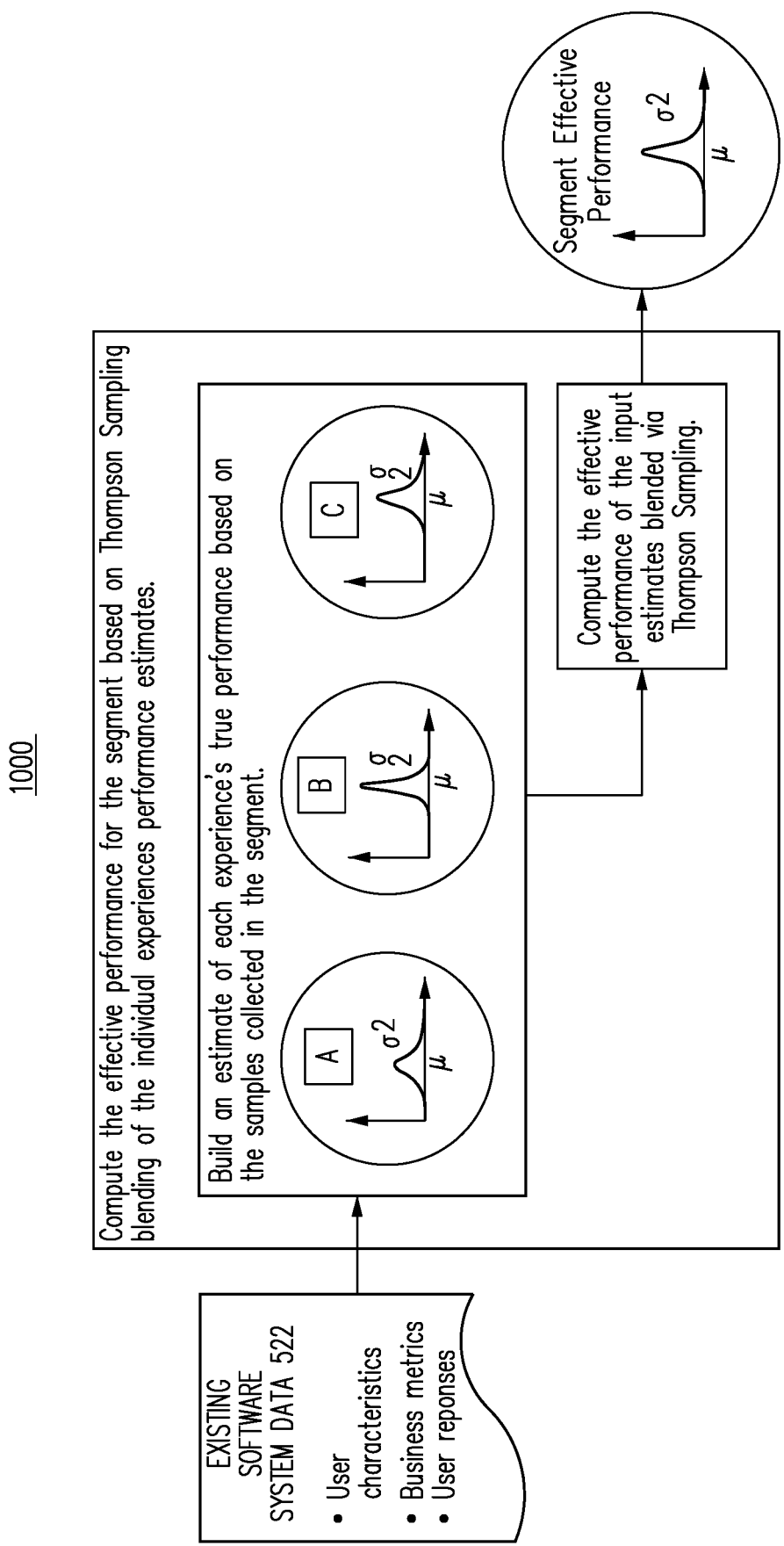
FIG. 10 is a flow diagram of an example of a process for computing the effective performance of a segment or subsegment of users, in accordance with one embodiment.

FIG. 10 illustrates an example of a flow diagram of a process 1000 for computing the effective performance of a segment or sub-segment of users, according to one embodiment. The process 1000 is an example of one technique that can be used by operation 812 (shown in FIG. 8) for the process 800 for defining an analytics model, according to one embodiment. The process 800 is an example of one technique that can be used in blocks 902 and/or 912 (shown in FIG. 9) for the process 900 for determining a stop probability, according to one embodiment.

The process 1000 uses existing software system data 522 to compute the effective performance for a segment based on Thompson Sampling blending of the performance of individual user experience options and/or based on each individual user's experience/feedback with the software system (e.g., in response to receiving the user experience option in the user's personalized user experience), according to one embodiment.

FIG. 11 illustrates an example flow diagram for a process 1100 for computing the effective performance of input estimates blended by Thompson Sampling, according to one embodiment. The process 1100 is an example of one technique that can be used in block 914 (show in FIG. 9) of the process 900 for determining a stop probability, according to one embodiment. The process 1100 is an example of one technique that can be used during the process 800 for computing the effective performance of a segment or sub-segment, according to one embodiment.

The process 1100 uses the probability density function ("PDF") and the cumulative distribution function ("CDF")

to determine the probability that the true performance of each user's experience or of each user experience option is better than alternative options, according to one embodiment. As illustrated in FIG. 11, the process 1100 computes the effective performance of an entire segment of users as a weighted combination of either each user's experience or of the distribution of a particular user experience option to the users of the segment of users, in one embodiment.

Figure 12A:
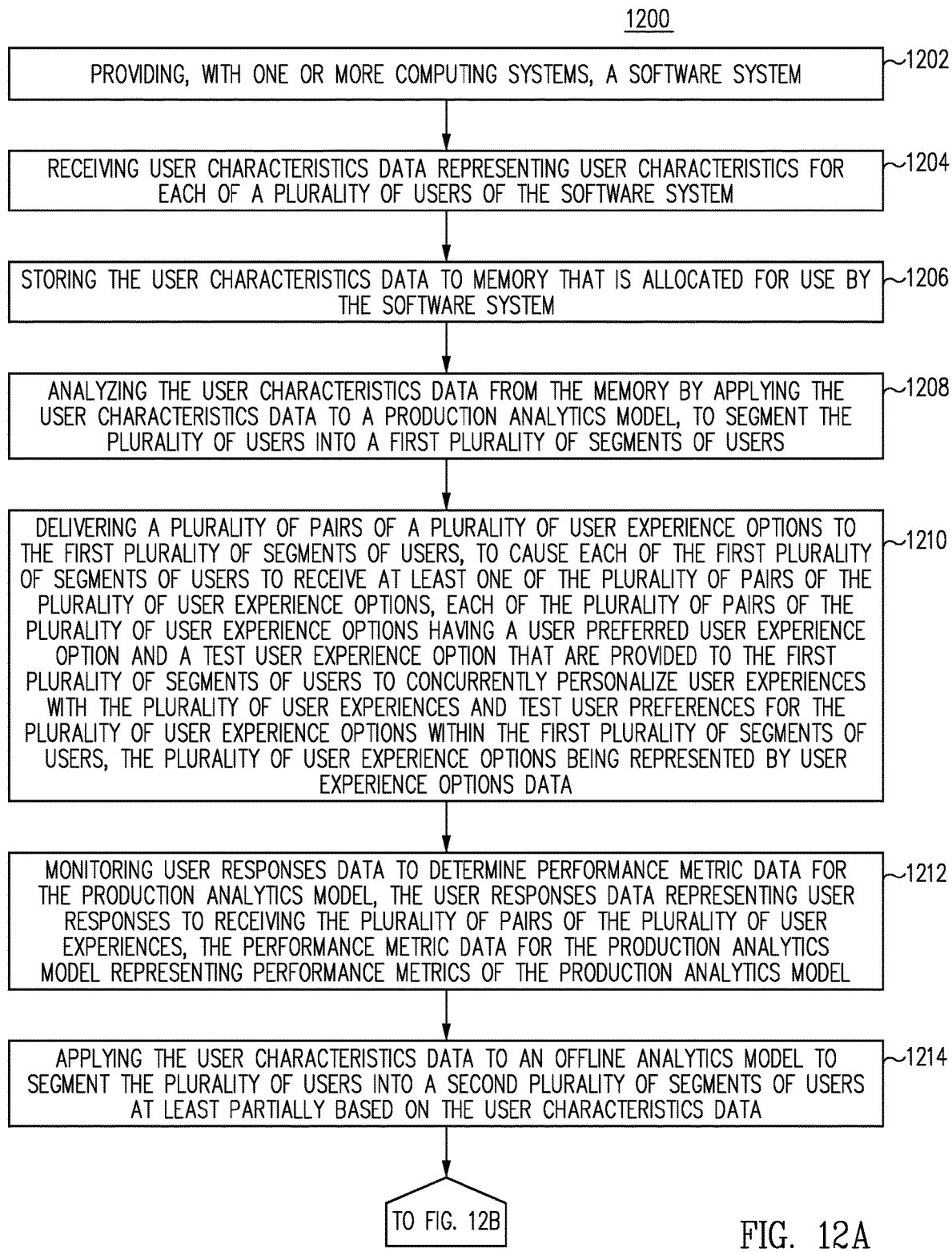
FIGS. 12A and 12B are a flow diagram of an example of a process for updating analytics models to improve delivery of personalized user experiences in a software system, according to one embodiment.
Figure 12B:
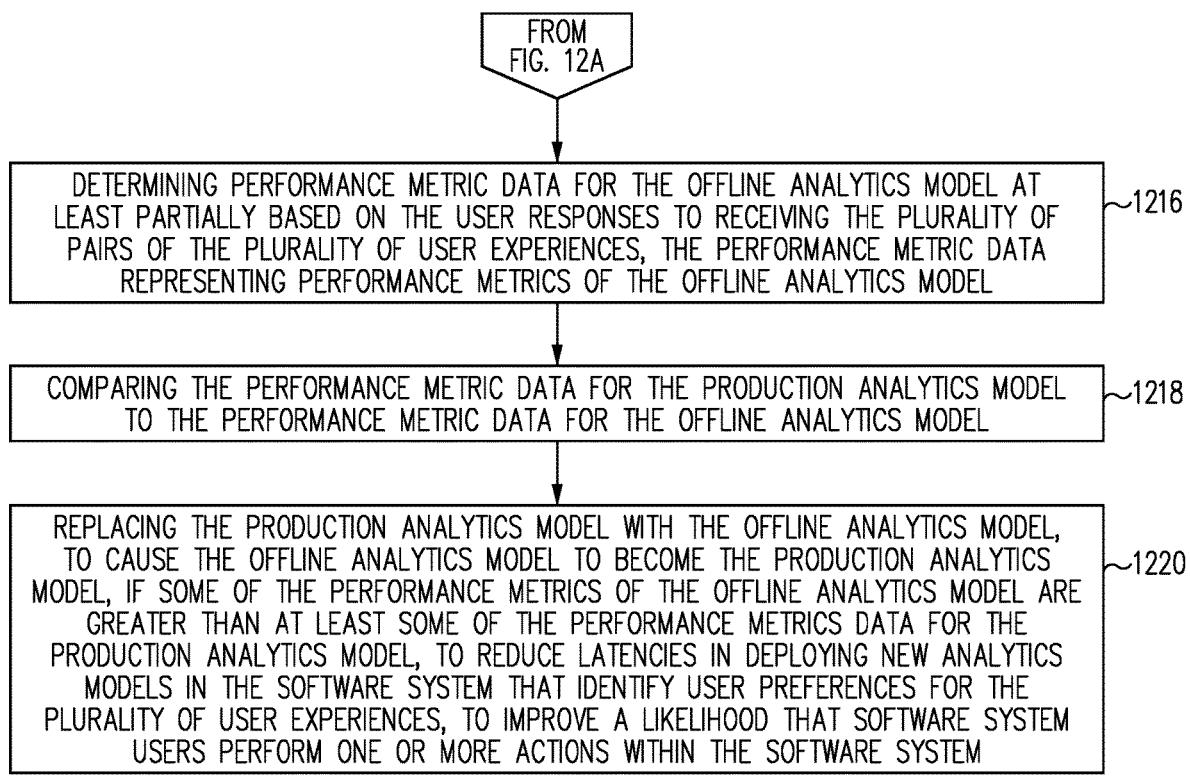

FIGS. 12A and 12B illustrate an example flow diagram of a process 1200 for updating analytics models to improve delivery of personalized user experiences in a software system, according to one embodiment.

At operation 1202, the process includes providing, with one or more computing systems, a software system, according to one embodiment.

At operation 1204, the process includes receiving user characteristics data representing user characteristics for each of a plurality of users of the software system, according to one embodiment.

At operation 1206, the process includes storing the user characteristics data to memory that is allocated for use by the software system, according to one embodiment.

At operation 1208, the process includes analyzing the user characteristics data from the memory by applying the user characteristics data to a production analytics model, to segment the plurality of users into a first plurality of segments of users, according to one embodiment.

At operation 1210, the process includes delivering a plurality of pairs of a plurality of user experience options to the first plurality of segments of users, to cause each of the first plurality of segments of users to receive at least one of the plurality of pairs of the plurality of user experience options, each of the plurality of pairs of the plurality of user experience options having a user-preferred user experience option and a test user experience option that are provided to the first plurality of segments of users to concurrently personalize user experiences with the plurality of user experiences and test user preferences for the plurality of user experience options within the first plurality of segments of users, the plurality of user experience options being represented by user experience options data, according to one embodiment.

At operation 1212, the process includes monitoring user responses data to determine performance metric data for the production analytics model, the user responses data representing user responses to receiving the plurality of pairs of the plurality of user experiences, the performance metric data for the production analytics model representing performance metrics of the production analytics model, according to one embodiment.

At operation 1214, the process includes applying the user characteristics data to an offline analytics model to segment the plurality of users into a second plurality of segments of users at least partially based on the user characteristics data, according to one embodiment.

At operation 1216, the process includes determining performance metric data for the offline analytics model at least partially based on the user responses to receiving the plurality of pairs of the plurality of user experiences, the performance metric data representing performance metrics of the offline analytics model, according to one embodiment.

At operation 1218, the process includes comparing the performance metric data for the production analytics model to the performance metric data for the offline analytics model, according to one embodiment.

At operation 1220, the process includes replacing the production analytics model with the offline analytics model, to cause the offline analytics model to become the production analytics model, if some of the performance metrics of the offline analytics model are greater than at least some of the performance metrics data for the production analytics model, to reduce latencies in deploying new analytics models in the software system that identify user preferences for the plurality of user experiences, to improve a likelihood that software system users perform one or more actions within the software system, according to one embodiment.

By automating analytics model updates to support providing personalized user experiences to users of a software system, implementation of embodiments of the present disclosure allows for significant improvement to the fields of user experience, electronic tax return preparation, data analytics, data collection, and data processing, according to one embodiment. As one illustrative example, by automating processes for training, testing and deploying updates to analytics models, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by automating the training, testing, and deployment of analytics models that provide personalized user experience options, implementation of embodiments of the present disclosure represent a significant improvement to the field of automated user experiences and, in particular, efficient use of human and non-human resources. There is a long lasting need in the Internet-centric technology of graphical user interfaces, for personalizing the user experiences to reduce user time and user effort to complete tasks in a computing environment. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, while adapting to changes in user behavior over time, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

In accordance with an embodiment, a computer system implemented method updates analytics models to improve delivery of personalized user experiences in a software system. The method includes providing, with one or more computing systems, a software system, according to one embodiment. The method includes receiving user characteristics data representing user characteristics for each of a plurality of users of the software system, according to one embodiment. The method includes storing the user characteristics data to memory that is allocated for use by the software system, according to one embodiment. The method includes analyzing the user characteristics data from the memory by applying the user characteristics data to a production analytics model, to segment the plurality of users into a first plurality of segments of users, according to one embodiment. The method includes delivering a plurality of pairs of a plurality of user experience options to the first plurality of segments of users, to cause each of the first plurality of segments of users to receive at least one of the plurality of pairs of the plurality of user experience options, each of the plurality of pairs of the plurality of user experience options having a user-preferred user experience option and a test user experience option that are provided to the first plurality of segments of users to concurrently personalize user experiences with the plurality of user experiences and test user preferences for the plurality of user experience options within the first plurality of segments of users, the plurality of user experience options being represented by user experience options data, according to one embodiment. The method includes monitoring user responses data to determine performance metric data for the production analytics model, the user responses data representing user responses to receiving the plurality of pairs of the plurality of user experiences, the performance metric data for the production analytics model representing performance metrics of the production analytics model, according to one embodiment. The method includes applying the user characteristics data to an offline analytics model to segment the plurality of users into a second plurality of segments of users at least partially based on the user characteristics data, according to one embodiment. The method includes determining performance metric data for the offline analytics model at least partially based on the user responses to receiving the plurality of pairs of the plurality of user experiences, the performance metric data representing performance metrics of the offline analytics model, according to one embodiment. The method includes comparing the performance metric data for the production analytics model to the performance metric data for the offline analytics model, according to one embodiment. The method includes replacing the production analytics model with the offline analytics model, to cause the offline analytics model to become the production analytics model, if some of the performance metrics of the offline analytics model are greater than at least some of the performance metrics data for the production analytics model, to reduce latencies in deploying new analytics models in the software system that identify user preferences for the plurality of user experiences, to improve a likelihood that software system users perform one or more actions within the software system, according to one embodiment.

In accordance with an embodiment, computer system implemented method updates analytics models to improve delivery of personalized user experiences in a software system. The method includes providing, with one or more computing systems, a software system, according to one embodiment. The method includes receiving user characteristics data representing user characteristics for each of a plurality of users of the software system, according to one embodiment. The method includes storing the user characteristics data to memory that is allocated for use by the software system, according to one embodiment. The method includes analyzing the user characteristics data from the memory by applying the user characteristics data to a production analytics model, to segment the plurality of users into a first plurality of segments of users, according to one embodiment. The method includes delivering, to one segment of the first plurality of segments of users, a first user experience option and a second user experience option, based on the user characteristics data, to concurrently personalize user experiences with the first user experience option and to test user satisfaction with the second user experience option within the one segment of the first plurality of segments of users, according to one embodiment. The method includes monitoring user responses data to determine performance metric data for the production analytics model, the user responses data representing user responses to receiving the first user experience option and the second user experience option, the performance metric data for the production analytics model representing performance metrics of the production analytics model, according to one embodiment. The method includes applying the user characteristics data to an offline analytics model to segment the plurality of users into a second plurality of segments of users at least partially based on the user characteristics data, according to one embodiment. The method includes determining performance metric data for the offline analytics model at least partially based on the user responses to receiving the first user experience option and the second user experience option, the performance metric data representing performance metrics of the offline analytics model, according to one embodiment. The method includes comparing the performance metric data for the production analytics model to the performance metric data for the offline analytics model, according to one embodiment. The method includes replacing the production analytics model with the offline analytics model, to cause the offline analytics model to become the production analytics model, if the offline analytics model is more likely than the production analytics model to identify users who are likely to be satisfied with the first user experience option, to reduce latencies in deploying new analytics models in the software system that identify user preferences for user experience options, to improve a likelihood that software system users perform one or more actions within the software system, according to one embodiment.

In accordance with an embodiment, a system updates analytics models to improve delivery of personalized user experiences in a software system. The system includes a memory that stores user characteristics data of current users and of prior users of a software system, according to one embodiment. The system includes one or more processors communicatively coupled to the memory to perform operations on the user characteristics of the current users and of the prior users of the software system, according to one embodiment. The system includes a system engine that receives, with one or more processors, the user characteristics data of the current users and user responses data of the current users, the user characteristics data of the current users representing user characteristics of the current users, the user responses data representing user responses of the current users, wherein the system engine stores the user characteristics data of the current users and the user responses data of the current users in the memory, according to one embodiment. The system includes a decision engine that receives, with the one or more processors, the user characteristics data of the current users from the memory and applies the user characteristics data of the current users to a production analytics model to identify a first percentage of a segment of the current users to which to provide first user experience data and to identify a second percentage of the segment of the current users to which to provide second user experience data, the first user experience data representing a first of a plurality of user experience options, the second user experience data representing a second of a plurality of user experience options, according to one embodiment. The system includes an analytics model manager that monitors performance metrics data of the production analytics model and monitors performance metrics data of an offline analytics model and that selectively updates the production analytics model with the offline analytics model, if the performance metrics data of the offline analytics model indicates a higher likelihood of potential customer conversions to paying customers than the performance metrics data of the production analytics model, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer system implemented method for updating analytics models to improve delivery of personalized user experiences in a software system, comprising:
    providing, with one or more computing systems, a software system;
    receiving user characteristics data representing user characteristics for each of a plurality of users of the software system;
    storing the user characteristics data to memory that is allocated for use by the software system;
    training a production analytics model by at least forming a production decision tree having rules and parameters governing traversing from a parent node to a child, the production decision tree including one or more of a production reach probability, a production stop probability, a production user experience option and a production user segment;
    training an offline analytics model by at least forming an offline decision tree having offline rules and offline parameters governing traversing from a parent node to a child, the offline decision tree including one or more of an offline reach probability, an offline stop probability, an offline user experience option and an offline user segment;
    analyzing the user characteristics data from the memory by applying the user characteristics data to the production analytics model, to segment the plurality of users into a first plurality of segments of users;
    delivering, to one segment of the first plurality of segments of users, a first user experience option and a second user experience option, based on the user characteristics data, to concurrently personalize user experiences with the first user experience option and to test user satisfaction with the second user experience option within the one segment of the first plurality of segments of users;
    monitoring user responses data to determine performance metric data for the production analytics model, the user responses data representing user responses to receiving the first user experience option and the second user experience option, the performance metric data for the production analytics model representing performance metrics of the production analytics model;
    applying the user characteristics data to the offline analytics model to segment the plurality of users into a second plurality of segments of users at least partially based on the user characteristics data;
    determining performance metric data for the offline analytics model at least partially based on the user responses to receiving the first user experience option and the second user experience option, the performance metric data representing performance metrics of the offline analytics model;
    comparing the performance metric data for the production analytics model to the performance metric data for the offline analytics model; and
    replacing the production analytics model with the offline analytics model, to cause the offline analytics model to become the production analytics model, if the offline analytics model is more likely than the production analytics model to identify users who are likely to be satisfied with the first user experience option.

2. The computer system implemented method of claim 1, wherein the software system is selected from a group of software systems consisting of: a tax return preparation system; a personal finances management system; and a business finances management system.

3. The computer system implemented method of claim 1, wherein prior to replacing the production analytics model with the offline analytics model, the method includes:
    determining a statistical strength of the offline analytics model exceeds a predetermined threshold for the statistical strength of the offline analytics model; and
    postponing replacing the production analytics model with the offline analytics model, if the statistical strength of the offline analytics model fails to exceed the predetermined threshold for the statistical strength of the offline analytics model.

4. The computer system implemented method of claim 3, wherein the offline analytics model is a decision tree having a plurality of nodes, and the statistical strength of the offline analytics model at least partially depends on a minimum number of data samples used to define each of the plurality of nodes.

5. The computer system implemented method of claim 4, wherein the minimum number of data samples is the predetermined threshold for the statistical strength.

6. The computer system implemented method of claim 5, wherein the minimum number of data samples is 50 data samples.

7. The computer system implemented method of claim 3, wherein the offline analytics model is a decision tree having a plurality of nodes and the statistic strength of the offline analytics model at least partially depends on a minimum number of data samples used to evaluate a performance of each of the plurality of nodes.

* * * * *